United States Patent
Nichols

(10) Patent No.: US 8,903,819 B2
(45) Date of Patent: Dec. 2, 2014

(54) SYSTEMS AND METHODS FOR SHARING PROFILE INFORMATION USING USER PREFERENCE TAG CLOUDS

(75) Inventor: Michael R. Nichols, La Canada-Flintridge, CA (US)

(73) Assignee: United Video Properties, Inc., Santa Clara, CA (US)

( * ) Notice: Subject to any disclaimer, the term of this patent is extended or adjusted under 35 U.S.C. 154(b) by 0 days.

(21) Appl. No.: 13/338,578

(22) Filed: Dec. 28, 2011

(65) Prior Publication Data

US 2013/0173533 A1     Jul. 4, 2013

(51) Int. Cl.
    *G06F 17/30* (2006.01)
(52) U.S. Cl.
    CPC ................. *G06F 17/30035* (2013.01)
    USPC .......................................... 707/734
(58) Field of Classification Search
    CPC .................................................. G06F 17/30035
    USPC .......................................... 715/811; 707/734
    See application file for complete search history.

(56) References Cited

U.S. PATENT DOCUMENTS

| | | | | |
|---|---|---|---|---|
| 8,200,667 | B2 * | 6/2012 | Choe et al. | 707/733 |
| 2008/0059897 | A1 * | 3/2008 | Dilorenzo | 715/764 |
| 2008/0222105 | A1 * | 9/2008 | Matheny | 707/3 |
| 2009/0094190 | A1 * | 4/2009 | Stephens | 707/2 |
| 2009/0158146 | A1 * | 6/2009 | Curtis et al. | 715/700 |
| 2009/0299725 | A1 * | 12/2009 | Grigsby et al. | 704/2 |
| 2010/0269067 | A1 * | 10/2010 | De Bel Air et al. | 715/811 |
| 2011/0153607 | A1 * | 6/2011 | Nauerz et al. | 707/737 |
| 2011/0276921 | A1 * | 11/2011 | Long | 715/825 |
| 2012/0005209 | A1 * | 1/2012 | Rinearson et al. | 707/737 |
| 2012/0158713 | A1 * | 6/2012 | Jin et al. | 707/728 |
| 2012/0278331 | A1 * | 11/2012 | Campbell et al. | 707/740 |

OTHER PUBLICATIONS

Disclosed Anonymously, Method and System for Aggregating Preference Tags associated with Users and Electronically Sharing Preference Tags Clouds with Service Providers and Users, Jun. 3, 2010, ip.com, pp. 1-6.*

* cited by examiner

*Primary Examiner* — Jorge A Casanova
(74) *Attorney, Agent, or Firm* — Ropes & Gray LLP

(57) ABSTRACT

Systems and methods for sharing user profile information using tag clouds are provided in accordance with various embodiments of the present invention. A first tag cloud may be generated from attributes stored in a first user profile and a second tag cloud may be generated from attributes stored in a second user profile. A user may drag-and-drop attributes between the two tag clouds and, in response, the underlying user profiles may be updated. Tag clouds may thus present a user's media preferences in an attractive and compelling visual arrangement that, in some embodiments, also functions as an intuitive interface for copying preferences between user profiles.

22 Claims, 15 Drawing Sheets

1400

```
<?xml version="1.0" encoding="UTF-8" ?>

<taste_profile>

<id>5113</id>
    <user>"David"</user>
    <profile_name>"David's Tag Cloud"</profile_name>

<tag_cloud_preferences>
        <shape>square</shape>
        <stencil></stencil>
        <font>"Arial"</font>
        <color>blue</color>
    </tag_cloud_preferences>

<attribute1>
        <attribute_name>"Mystery"</attribute_name>
        <weighting>5</weighting>
    </attribute1>

<attribute2>
        <attribute_name>"Adventure"</attribute_name>
        <weighting>8</weighting>
    </attribute2>

<attribute3>
        <attribute_name>"Musical"</attribute_name>
        <weighting>10</weighting>
    </attribute3>

...

</taste_profile>
```

```xml
<?xml version="1.0" encoding="UTF-8" ?>

<tag_cloud>

<id>5113</id>
    <user>"David"</user>
    <tag_name>"David's Tag Cloud"</tag_name>

<tag_cloud_preferences>
        <font>"Arial"</font>
        <color>blue</color>
    </tag_cloud_preferences>

<attribute1>
        <attribute_name>"Mystery"</attribute_name>
        <font_size>5</font_size>
        <x_location>0</x_location>
        <y_location>3</y_location>
    </attribute1>

<attribute2>
        <attribute_name>"Adventure"</attribute_name>
        <font_size>8</font_size>
        <x_location>20</x_location>
        <y_location>2</y_location>
    </attribute2>

<attribute3>
        <attribute_name>"Musical"</attribute_name>
        <weighting>10</weighting>
        <x_location>45</x_location>
        <y_location>0</y_location>
    </attribute3>

...

</tag_cloud>
```

FIG. 15

SYSTEMS AND METHODS FOR SHARING PROFILE INFORMATION USING USER PREFERENCE TAG CLOUDS

BACKGROUND OF THE INVENTION

Modern day consumers are confronted with numerous entertainment options and an immeasurable amount of available media content. Thousands of videos, songs, and articles are available to users through the Internet, television, and other gateways to media content. In such an environment, recommendation engines that suggest content to users have taken on increasing importance. Examples include media guidance applications and web sites that recommend movies, books, and other content to users based on user preference information.

Traditional systems often monitor a user's behavior (e.g., ongoing media selections) to gather preference information. Of course, another preferred source of user preference data is the user herself. Traditional systems sometimes allow a user to specify preference information directly, e.g., by filling out a questionnaire. However, new techniques for displaying user preference information and for receiving such information directly from a user remain highly desirable.

SUMMARY OF THE INVENTION

Accordingly, systems and methods for sharing user profile information using tag clouds are provided in accordance with various embodiments of the present invention. A user preference tag cloud may present a user's media preferences in an attractive and compelling visual arrangement that, in some embodiments, also functions as an intuitive interface for comparing user profile information and for copying preferences between user profiles.

In some embodiments, a first user profile and a second user profile are retrieved, e.g., from a database. The user profiles (also referred to herein as "taste profiles") may be associated with a single user or different users. The first user profile includes a first set of media content attributes (defining the user's tastes in media content), which are used to generate a first tag cloud. Similarly, the second user profile includes a second set of media content attributes, which are used to generate a second tag cloud. The tag clouds may be generated using tag cloud processing circuitry, or by a software program executed by a processor. In response to a user indication (e.g., a drag-and-drop from the second tag cloud to the first tag cloud), a particular media content attribute from the second tag cloud may be automatically copied to the first tag cloud. The copying process between tag clouds may be performed by the tag cloud processing circuitry, or by the aforementioned software program. In turn, the first user profile may be updated to add the copied media content attribute to the first set of media content attributes. For instance, the database may be automatically updated to add the copied media content attribute to the first set of media content attributes stored in the first user profile.

In some embodiments, each of the media content attributes in the aforementioned first and second sets of attributes has an assigned weighting factor indicating a level of importance of the given media content attribute to a user. In such an embodiment, the first and second tag clouds may be generated, in part, by rendering each of the media content attributes in a font size indicative of its assigned weighting factor. When a media content attribute is copied from the second tag cloud to the first, the copied media content attribute may be assigned a weighting factor. This weighting factor may be based on the weighting factor assigned to the same media content attribute in the second tag cloud, the weighting factors assigned to the media content attributes in the first set of media content attributes, user preference information, and/or manual user input.

In some cases, the first tag cloud must be modified to accommodate the copied media content attribute. In one approach, the copying process includes identifying an existing media content attribute in the first set of media content attributes as a candidate for removal. For instance, the media content attribute with the smallest assigned weighting factor may be identified within the set. The identified media content attribute may then be removed from the first tag cloud to make room for the copied attribute. Then, the copied media content attribute may be rendered in a font size indicative of its assigned weighting factor.

In another approach, the copying process includes modifying the font size of each existing media content attribute in the first tag cloud to make room for the copied attribute. The amount of reduction may be based on the weighting factor assigned to the copied media content attribute. Then, the copied media content attribute may be rendered in a font size indicative of its assigned weighting factor (e.g., adjusted in the same way as the existing attributes).

In some embodiments, the first tag cloud is rendered in a first font characteristic and the second tag cloud is rendered in a second font characteristic different from the first font characteristic. A font characteristic, as used herein, refers to one or more of a font size, font face, font style, a foreground or background color, a highlight, a border, or any other suitable display attribute applicable to text. Accordingly, in one embodiment, each of the media content attributes of the first user preference tag cloud is rendered in a first color and each of the media content attributes of the second user preference tag cloud is rendered in a second color.

In some embodiments, media listings may be searched to identify media content that matches one or more of the media content attributes within the first tag cloud. A media listing that corresponds to the identified media content may then be displayed in a display screen simultaneously with the first tag cloud. In addition, the media listings may be searched to identify media content that matches one or more of the media content attributes within the second tag cloud. A media listing that corresponds to the latter identified media content may then be displayed in the display screen simultaneously with the first tag cloud, the first identified media listing, and the second tag cloud.

Searching media listings to identify media content that matches one or more of the media content attributes within a user preference tag cloud may involve comparing those attributes to attributes in the media listings. In one approach, the best matching media content is determined. This determination may be based on the weighting factors assigned to the media content attributes. For instance, media content matching media content attributes with large weighting factors may be prioritized over media content matching media content attributes with low weighting factors. At least one of the media listings may be displayed in a display screen (e.g., of a media guidance application) in response to the determination.

In some embodiments, a user indication to add or remove one of the media content attributes from the user preference tag cloud may be received. The user preference tag cloud may be modified in response to the user indication, e.g., so that the media content attribute appears or is removed from the tag cloud, respectively. Furthermore, the user profile information may be updated based on the user indication, e.g., to add or remove the media content attribute from the user profile information.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 14 shows an illustrative example of a taste profile stored as a file in Extensible Markup Language (XML) in accordance with some embodiments of the invention; and FIG. 15 shows an illustrative example of a tag cloud stored as a file in Extensible Markup Language (XML) in accordance with some embodiments of the invention.

DETAILED DESCRIPTION OF THE VARIOUS EMBODIMENTS

Figure 1:
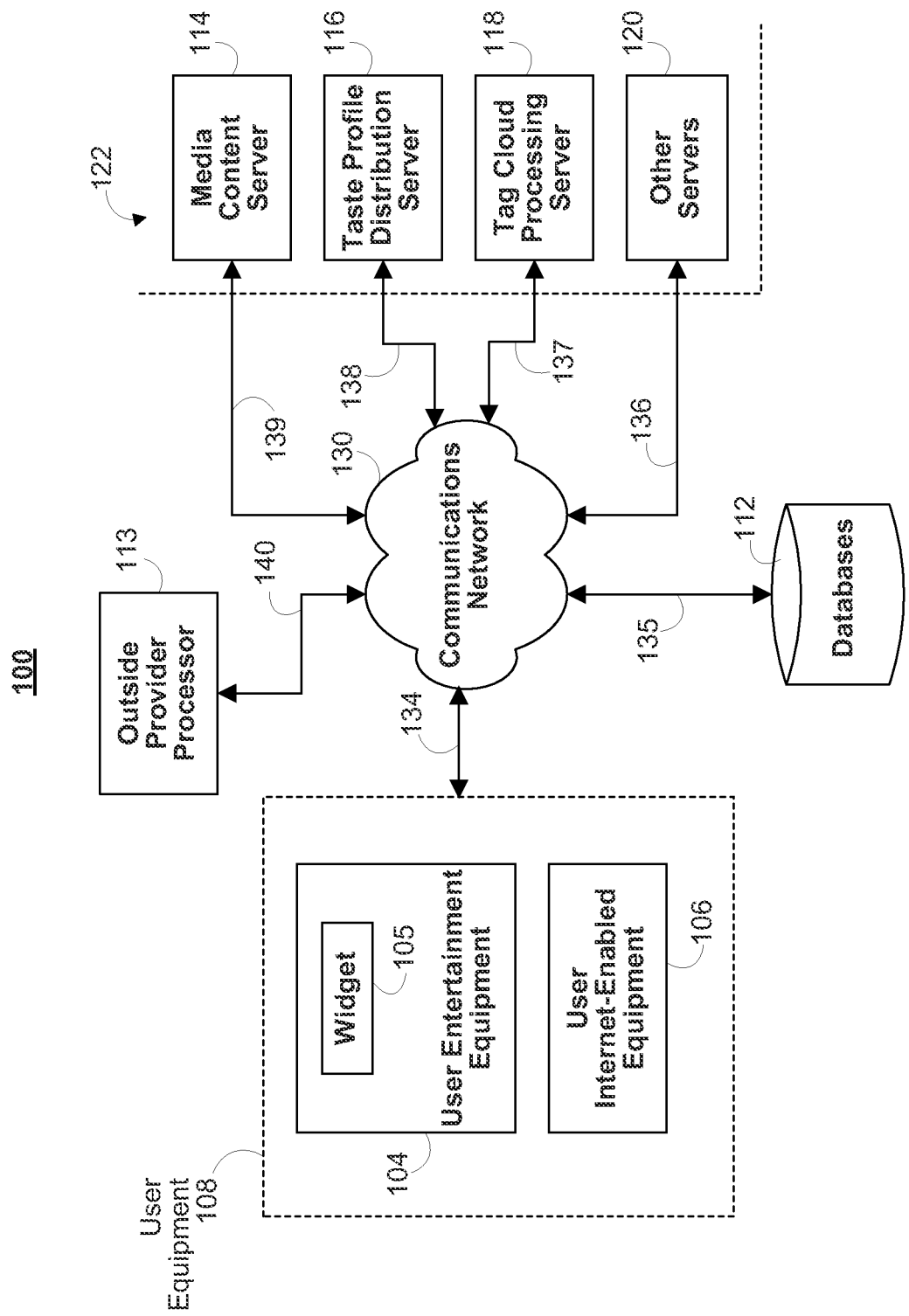
FIG. 1 illustrates an example of a system for generating and managing taste profiles and user preference tag clouds in accordance with some embodiments of the present invention.

A tag cloud is a collection of words associated with a central subject where the words vary in size, color, background, style or other font characteristic based on the relationship between each word and the central subject. For example, each word in a tag cloud may be sized in accordance with its degree of importance or relevance to the central subject. Tag clouds are therefore useful as a means of presenting information related to user preferences in a media guidance application, web site, or other graphical user interface. When employed for this purpose, a tag cloud may include attributes defining a user's interest (e.g., taste) in media categories such as television, movies, music, games, books, etc. Attributes reflective of a user's media content preferences are referred to herein as media content attributes or, simply, attributes. Such media content attributes may be stored in a user preference profile (i.e., user profile). A tag cloud made up of various media content attributes is referred to herein as a user preference tag cloud. User preference tag clouds, including techniques for modifying and shaping the tag clouds and the underlying profile information, are described in greater detail in U.S. patent application Ser. No. 13/170,633, filed Jun. 28, 2011, which is hereby incorporated by reference herein in its entirety.

The degree of interest a user has in a particular media content attribute may be reflected in a user preference tag cloud by varying the size or other font characteristic of that attribute. For example, the bigger the size of an attribute the more desirable that attribute may be to the user. Font characteristics may also be used to indicate other criteria pertaining to an attribute, such as its category, whether the attribute was recently added, or whether the attribute recently increased or decreased in desirability to the user. Furthermore, information pertaining to the user other than the user's media content preferences may be reflected in a user preference tag cloud through use of font characteristics. For example, attributes may be presented in a different color or font face depending on demographic information associated with the user (e.g., depending on the age, gender, profession, or location of the user). It should be understood that any number of font characteristics may be used to convey information about an attribute or about the user associated with the user preference tag cloud.

As previously described, a user profile may store media content attributes reflective of the user's media content preferences. These media content attributes may be generated automatically (e.g., by monitoring the user's media consumption habits) and/or added manually by the user. Of course, a user's media content preferences may change depending on the user's mood, or the user may prefer to have a variety of media content attribute groupings at his disposal. Accordingly, a user may have multiple taste profiles each containing s different set of media content attributes. A taste profile, as used herein, refers to a data record storing a set of media content attributes. In turn, these sets of media content attributes may each be displayed as a user preference tag cloud. It should be understood that rather than storing each taste profile associated with a user as a separate user profile, a single user profile can include all of a user's taste profiles. The structure of taste profiles is described in further detail below in connection with FIG. 3.

When a user has multiple taste profiles, the associated user preference tag clouds may be distinguished using any suitable display technique. For example, font characteristics of attributes in a user preference tag cloud may be customized for each tag cloud. Thus, for instance, the attributes in one user preference tag cloud may be displayed with blue attributes while another contains pink attributes. As another example, each user preference tag cloud may be shaped differently, e.g., using different stencils. Stencils are outlines of figures or images that are used to create tag clouds by defining the dimensions and shape of an area to be populated by text (i.e., media content attributes). Stencils and techniques for shaping tag clouds are described in greater detail in U.S. patent application Ser. No. 13/170,633, filed Jun. 28, 2011, referred to above.

Accordingly, user preference tag clouds can be used to present preference information to users in a compelling and efficient manner. Specifically, a user may be presented with one or more tag clouds that convey layers of information about media content attributes the user is particularly interested in (e.g., by displaying the attributes in a size indicative of their importance to the user and a color indicative of their respective taste profiles). These tag clouds may update to reflect the latest user preferences and/or may be directly modified by the user, as discussed below in greater detail.

Taste profiles, and their corresponding user preference tag clouds, may be shared amongst multiple users. In particular, users may be provided with tools to publish or otherwise transmit their taste profiles to other users. Taste profiles may also be compared and/or one taste profile may be used to update another. Moreover, each of these features may involve the use of user preference tag clouds associated with each taste profile. Specifically, each user preference tag cloud may be used as an interface to access the underlying media content attributes of the respective taste profile. The features of sharing, comparing, and updating multiple taste profiles via their respective tag clouds will be discussed below in greater detail.

User preference tag clouds may be displayed to a user using any suitable graphical user interface (e.g., on a web site, in a software application, in a display screen of a media guidance application, on an e-book reader screen, etc.). A user preference tag cloud may be stored and/or displayed as an image file, text file, or any other suitable data file or record. Alternatively, a user preference tag cloud may be generated from its corresponding taste profile each time it is displayed. As discussed above, a taste profile may be stored as its own data record (e.g., in a database or as a file on a storage device), or a taste profile may be part of a user profile that also stores other information, such as user demographic information. In some embodiments, taste profiles and user preference tag clouds may be generated and/or managed by a widget.

Widgets are applications (i.e., collections of instructions executable by a processor) that provide information from the Internet and/or otherwise remotely accessible servers (hereinafter "remote servers") to a user. A widget may provide this information through web services and/or using any suitable communication protocol (e.g., TCP/IP, IPTV, etc.). Widgets may also perform local processing tasks, such as generating and managing taste profiles and user preference tag clouds, and may also control display features of user equipment, such as hardware and software tasks involved in displaying user preference tag clouds. These widget capabilities, as well as additional widget functionality, will be described in greater detail below.

A widget may run on a television, user equipment associated with a television, and/or other user equipment capable of providing media to a user (e.g., a mobile phone, e-reader, tablet, camera, or video player). Television widgets are widgets that run strictly on the hardware platform (e.g., control circuitry) of a television. Typically, television widgets have limited interactions with external user equipment and databases, such as set-top boxes and third party servers. It will be understood that where the below description refers to a widget or widgets, the term is inclusive of television widgets and other applications with widget-type functionality. For example, a widget may be or include a JAVA applet executable on a mobile device. JAVA is a registered trademark owned by Sun Microsystems, Inc. More generally, a widget may be, include, or be part of an application, a software module, or other suitable set of computer-readable instructions. A widget may also be referred to, in some instances, as an "app."

In accordance with an embodiment of the present invention, a widget may be used to generating and/or managing taste profiles and user preference tag clouds. For example, a widget running on a television or set-top box may generate and/or display the user preference tag cloud in a display screen of a media guidance application. The widget may accordingly access user profile information, as discussed in greater detail below.

FIG. 1 illustrates an example of a system 100 for generating and managing taste profiles and user preference tag clouds in accordance with some embodiments of the present invention. System 100 may include user equipment 108, which may include one or both of user entertainment equipment 104 and user internet-enabled equipment 106. User entertainment equipment 104 may include user television equipment, user computer equipment, a wireless user communication device, an e-reader, a set-top box, or any other type of user entertainment equipment for accessing media, such as a non-portable or portable gaming machine. User internet-enabled equipment 106 may include a set-top box, an integrated receiver decoder (IRD) for handling satellite television, a PC, a laptop, a tablet, an e-reader, a WebTV box, a personal computer television (PC/TV), a PC media server, a PC media center, a television set, a digital storage device, a DVD recorder, a video-cassette recorder (VCR), a local media server, wireless user communications devices, or any other suitable internet-enabled equipment. WEBTV is a trademark owned by Microsoft Corp. Wireless communications devices may include PDAs, a mobile telephone, a smartphone, a portable music player, a portable gaming machine, or other wireless devices.

In system 100, there is typically more than one of each type of user equipment device but only one of each is shown in FIG. 1 to avoid overcomplicating the drawing. In addition, a user may utilize more than one type of user equipment device (e.g., a user may have a television set and a computer) and also more than one of each type of user equipment device (e.g., a user may have a PDA and a mobile telephone and/or multiple television sets).

It should be noted that with the advent of television tuner cards for PC's, WebTV, and the integration of video into other user equipment devices (e.g., mobile phones), the lines have become blurred when trying to classify a device as a user entertainment device or a user internet-enabled device. Each of user equipment 108 may utilize at least some of the system features described below with respect to FIG. 2 and, as a result, include flexibility with respect to the type of interactive applications available on the device. For example, user entertainment equipment 104 may be internet-enabled allowing for access to information through the Internet, while user internet-enabled equipment 106 may include a tuner allowing for access to television programming. It should therefore be understood that, in some embodiments, user entertainment equipment 104 and user internet-enabled equipment 106 are integrated components of a single user device (i.e., user equipment 108).

In some embodiments, system 100 includes widget 105. Widget 105 may be resident in user entertainment equipment 104 within user equipment 108. Alternatively, widget 105 may be resident in user internet-enabled equipment 106 within user equipment 108. In still other embodiments, widget 105 may run on user internet-enabled equipment 106 in addition to user entertainment equipment 104.

Widget 105 may be a software application that is downloaded or installed, for instance, in user entertainment equipment 104. Widget 105 may be executed by an interpreter or virtual machine running, for example, on control circuitry of user entertainment equipment 104 (e.g., control circuitry 204 of FIG. 2). Widget 105 may allow users to interact with web services while watching television or other video programs on user entertainment equipment 104. In some embodiments, widget 105 may run on the Yahoo! Connected TV platform, and user entertainment equipment 104 may be a television manufactured with built-in support for widget 105 (e.g., from one of Samsung Group, Sony Group, LG Electronics, or Vizio).

Figure 2:
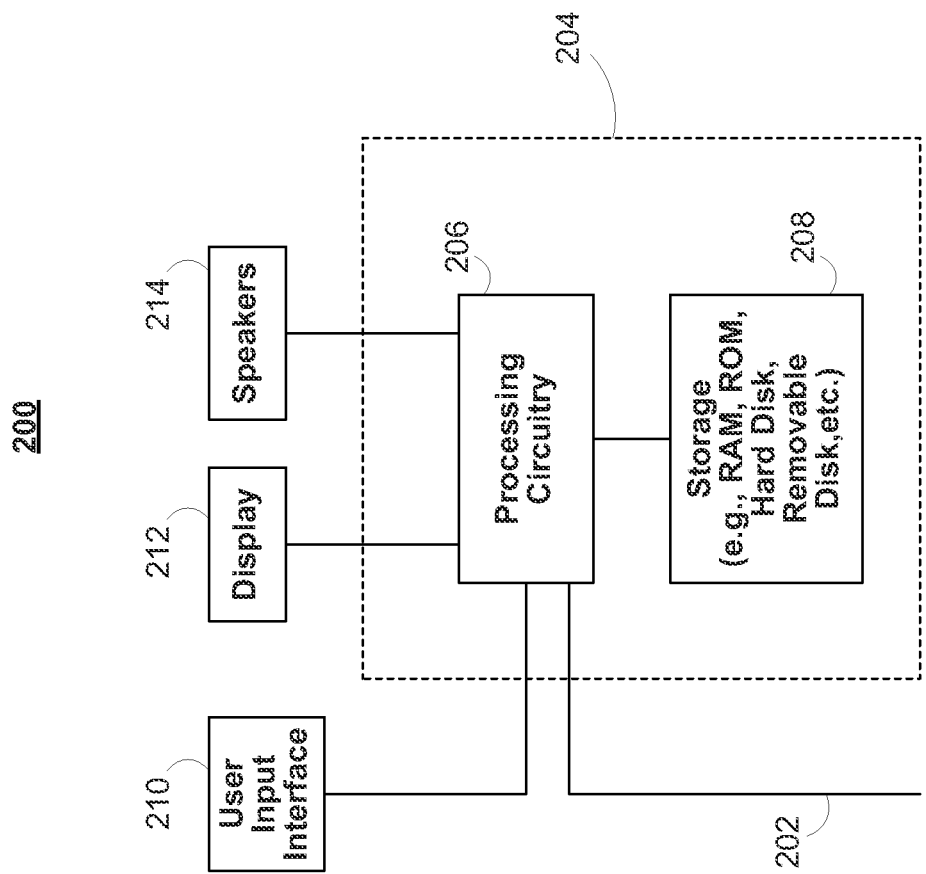
FIG. 2 illustrates an example of a user equipment device in accordance with some embodiments of the present invention.

In some embodiments, widget 105 may be one of several widgets that make up an application packaged and/or encoded in the ETV Binary Interchange Format (EBIF), received by control circuitry 204 of FIG. 2 as part of a suitable feed, and interpreted by a user agent running on control circuitry 204. For example, widget 105 may be part of an EBIF application and user entertainment equipment 104 may be a set-top box. In other embodiments, the widget may be defined by one or more JAVA-based files that are received and run by a local virtual machine or other suitable middleware executed by control circuitry 204 of FIG. 2. In yet other embodiments (e.g., those employing MPEG-2 or other digital media encoding schemes), the widget may be encoded and transmitted in an MPEG-2 object carousel with the MPEG audio and video packets of a program. In this embodiment, widget 105 may be part of an OpenCable Application Platform (OCAP) application (e.g., a tru2way application), and user entertainment equipment 104 may be a set-top box.

Widget 105 may have the same display layout and/or execution parameters on various types of user equipment or may be tailored to the display and/or processing capabilities of the user equipment. For example, on user entertainment equipment 104, widget 105 may run as a persistent (e.g., always-running) application. In another example, the widget display screens may be scaled down for wireless user communications devices.

In some embodiments, user equipment 108 may access and/or run a media guidance application that provides an interface that allows users to efficiently navigate through media selections and easily identify media content that they may desire. Media guidance applications may take various forms depending on the media for which they provide guidance. One typical type of media guidance application is an interactive television program guide. Interactive television program guides (sometimes referred to as electronic program guides or EPGs) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), recorded programs, and other types of media content (e.g., audio content). Moreover, media guidance applications allow users to navigate among and locate content related to the media content for which guidance is provided including, for example, video clips, audio assets, articles, advertisements, chat sessions, games, etc. Media guidance applications may be provided as on-line applications (i.e., provided on a web-site), or as stand-alone applications or clients.

In accordance with some embodiments of the present invention, a user preference tag cloud may be generated and/or displayed by a widget, media guidance application, or other suitable software application running on a user device (e.g., user equipment 108) and/or an external server (e.g., servers 122). The user preference tag cloud may be generated from a corresponding taste profile associated with a user.

In some embodiments, the user may enter user profile information into user equipment 108. The user profile information may be stored within user equipment 108 (e.g., storage 208 of FIG. 2) or in a remote data store (e.g., one of databases 112). The user profile information may be used and maintained across in-home devices and remote devices. For example, if a user indicates a certain television show as a favorite on, for example, the web site www.tvguide.com on their personal computer at their office, the same show would appear as a favorite on the user's in-home devices (e.g., in a media guidance application running on user entertainment equipment 104). Therefore, changes in the user profile made on one user equipment device can change the user's experience on another user equipment device, regardless of whether they are the same or a different type of user equipment device. In addition, the changes made may be based on information input by a user, as well as monitored user activity.

In some embodiments, user profile information may include data from monitoring a user's activity. For example, user interaction with widget 105, a media guidance application, and/or any other suitable application or feature (e.g., running on or displayed by user equipment 108) may be monitored and recorded. User profile information may also include user-identifying information (e.g., the user's name), user viewing habits, user demographic information, or any other suitable data relating to and/or describing a user. User profile information may be stored within user equipment 108 and/or at a remote location (e.g., databases 112).

Taste profiles may be generated from the aforementioned user profile information. In particular, user taste profiles include attributes for one or more categories of media content that are of interest to the user (i.e., media content attributes). Media content categories include television shows, movies, music, books, articles, games, etc. Attributes may be specific to the media content category and may specify genre, actor, artist, theme, title, length, etc. For example, user taste profiles may include the following media content attributes: sitcoms (television), documentaries (movies), country (music), and user-generated content (Internet). In one approach, the user taste profile includes a listing of each attribute and its associated category. In another approach, each attribute is categorized according to its associated category. The taste profile may include only those media content attributes in each category that are of interest to the user. Alternatively, the taste profile may include all available media content attributes for each category and an indication of user interest may be associated with each attribute. For example, in an embodiment, each attribute is associated with a priority and/or weighting, as discussed in greater detail below.

In an embodiment, media content attributes may be extracted from user monitoring data. For example, attributes may be extracted from television shows the user previously viewed or selected. Techniques for identifying attributes of media content and searching for related content on that basis are described in greater detail in Herrington et al. U.S. Pat. No. 6,865,746, issued Mar. 8, 2005, which is hereby incorporated by reference herein in its entirety. In another embodiment, attributes may be retrieved from a social networking service or other external server. Attributes may also be directly input by the user.

The user equipment devices of user equipment 108 may be coupled to communications network 130 using communications path 134. Communications network 130 may be one or more networks including a local area network, a wide area network, the Internet, a mobile phone network, mobile device (e.g., Blackberry) network, cable network, public switched telephone network, or other types of communications networks. BLACKBERRY is a service mark owned by Research In Motion Limited, Corp. Paths 134-140 may separately or together include one or more communications paths, such as, a satellite path, a fiber-optic path, a cable path, a path that supports Internet communications (e.g., TCP/IP, IPTV, etc.), free-space connections (e.g., for broadcast or other wireless signals), or any other suitable wired or wireless communications path or combination of such paths. Communications with the user equipment devices may be provided by one or more of these communications paths, but are shown as single paths in FIG. 1 to avoid overcomplicating the drawing.

Although communications paths are not drawn between user equipment devices 104 and 106, these devices may communicate directly with each other through communications network 130 and/or via short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other indirectly, e.g., through an indirect path via communications network 130.

When a user preference tag cloud is to be displayed on user equipment 108, widget 105 may be invoked to generate and/or display the tag cloud. In some embodiments, widget 105 is invoked expressly by the user, for instance, in response to an indication or selection received from the user (e.g., via user input interface 210 of FIG. 2). In other embodiments, widget 105 is invoked automatically, for example, upon display of a media guidance display screen. In response to invocation, widget 105 may send information to outside provider processor 113 (hereinafter "OPP 113") over communications network 130 (including, e.g., paths 134 and 140). In some embodiments, communications with OPP 113 may be exchanged over one or more communications paths, but are shown as two separate paths in FIG. 1 to avoid overcomplicating the drawing. In addition, there may be more than one outside provider processor, but only OPP 113 is shown in FIG. 1 to avoid overcomplicating the drawing. OPP 113 may be provided by a service provider, which may be the originator of media content, e.g., a television or internet broadcaster, a Webcast or streaming video provider, a digital cable service provider, a bundled communication (e.g., Internet, telephone, and TV) provider such as Verizon FiOS, a provider of digital on-demand media, a cellular telephone service provider, etc. Alternatively, the service provider may not be the originator of media content, e.g., an on-demand media content provider, an Internet provider of video content of broadcast programs for downloading or streaming, etc. A service provider may include cable sources, satellite providers, on-demand providers, Internet providers, or other providers of media content. A service provider may also include a remote media server used to store different types of media content in a location remote from any of the user equipment devices. As used herein, the term broadcaster may refer to an analog or digital signal provider, a cable network, a satellite provider, an Internet website, an Internet content provider, or any such provider that may distribute media content such as video assets to user equipment or user equipment devices. As used herein, the terms broadcaster's website or media broadcaster's website may refer to one or many web addresses, server addresses, databases, or other sources of media information or media content, specific to a particular broadcaster, and associated with Internet websites or other content providers. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

OPP 113 may include a data processor (e.g., any suitable computer server equipment) operated by an outside provider that can act as a central hub for communications between widget 105 running on user equipment 108 and third party servers 122. OPP 113 may also be implemented as a set of servers located in one or more regional areas, such that OPP 113 represents what has become knows as "the cloud." As will be discussed, third party servers 122 may include media content server 114, taste profile distribution server 116, tag cloud processing server 118, and other servers 120. In some embodiments, OPP 113 may store and retrieve information from databases 112. Databases 112 may be any suitable computer server equipment and/or any suitable data storage device.

Media content server 114 may broadcast or otherwise transmit media content to user equipment 108. The media content may be transmitted at a scheduled time or in response to a request, e.g., as video-on-demand (VOD). In one approach, the media content may be delivered to user equipment 108 over-the-top (OTT) using broadband services. A set-top box or other processing circuitry in user equipment 108 may decode the media content and output the media content in one or more formats. For example, media content may be received by a set-top box in a standard web format (e.g., MPEG, FLASH, H.264, Ogg, etc.) and converted into a standard television signal for display on a television screen. In this approach, even vintage television sets may display web-originated video.

Media content server 114 may also provide media guidance data, such as media listings, media-related information and attributes (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips or segments, etc.), on-demand information, and any other type of guidance data that is helpful for a user to navigate among and locate desired media selections.

Media content server 114 may include any suitable computer server equipment capable of broadcasting or delivering media content and related information. Such servers may include traditional head-ends, such as television broadcast stations, and may include internet servers configured to deliver content upon request (e.g., on-demand, streaming content, downloadable content). For example, a media content server may be one belonging to Hulu, Netflix, Apple, or Amazon.com. In some embodiments, media content server 114 may send inventory and other information to OPP 113 via communications network 130. For example, media content server 114 may send OPP 113 information regarding media content available via video-on-demand or digital download. The inventory information may be provided, for example, to a media guidance application on user equipment 108.

Taste profile distribution server 116 may include any suitable computer server equipment capable of receiving/providing taste profiles from/to user equipment 108 or OPP 113. Server 116 may communicate with databases 112 to retrieve user profile information and other relevant data to generate taste profiles. Alternatively, user profile information may be provided to server 116 from OPP 113 or widget 105. Server 116 may be, in some embodiments, a repository of taste profiles. These taste profiles may be associated with identifying information that may substantially match user information. Server 116 may alternatively be an internet server such as that belonging to a social networking service (e.g., Facebook). A social networking service may provide taste profiles of users that may be retrieved using user information. Other taste profiles may also be accessible that match user information, or that are associated with user information (e.g., taste profiles of the user's friends). In some embodiments, server 116 is the same server as media content server 114 and/or tag cloud processing server 118.

Tag cloud processing server 118 may include any suitable computer server equipment capable of processing stencils and/or taste profiles. Processing may include digital image processing, text processing, and/or any other sort of digital content manipulation. The processing features of tag cloud processing server 118 may be implemented in hardware, software, or both. Processing stencils and user profile information may include altering the geometrical properties of the stencil, identifying attributes within the profile information, and arranging text (i.e., the attributes) within the stencil.

Other servers 120 may include any suitable computer server equipment not mentioned in the description above. For example, other servers 120 may include image or video processing web sites or applications. In some embodiments, other servers 120 may transmit information to OPP 113 or to user equipment 108 via network 130.

FIG. 2 illustrates an example of generalized user equipment 200 in accordance with some embodiments of the present invention. User equipment 200 may be substantially the same as, or may be comprised within, user equipment 108 of FIG. 1. In one approach, user equipment device 200 may receive and send information to and from OPP 113 or servers 122 (FIG. 1) via input/output (hereinafter "I/O") path 202. I/O path 202 may provide data to control circuitry 204, which may include processing circuitry 206 and storage 208. I/O path 202 may connect control circuitry 204 (and specifically processing circuitry 206) to communications network 130 of FIG. 1. I/O functions may be provided by one or more communication paths, but are shown as a single path in FIG. 2 to avoid overcomplicating the drawing.

Control circuitry 204 may include any suitable processing circuitry 206 such as processing circuitry based on one or more microprocessors, microcontrollers, digital signal processors, programmable logic devices, etc. In some embodiments, control circuitry 204 executes instructions for widget 105 (FIG. 1) and/or other applications stored in memory (i.e., storage 208). In client-server based embodiments, control circuitry 204 may include communications circuitry suitable for communicating with networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (described in more detail in connection with FIG. 1). In addition, communications circuitry may include circuitry that enables peer-to-peer communication between user equipment devices, or communication between user equipment devices located remotely from each other (described in more detail in connection with FIG. 1).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 208 that is part of control circuitry 204. Storage 208 may include one or more of the above types of storage devices. For example, user equipment device 200 may include a hard drive for a DVR (sometimes called a personal video recorder, or PVR) and a DVD recorder as a secondary storage device. Storage 208 may be used to store various types of media and data described herein, including program information, widget settings, user preferences or profile information, taste profiles, media elements, video assets, or data used in operating widget 105. Nonvolatile memory may also be used (e.g., to launch a boot-up routine and other instructions).

Control circuitry 204 may include video generating circuitry and tuning circuitry, such as one or more analog tuners, one or more MPEG-2 decoders or other digital decoding circuitry, high-definition tuners, or any other suitable tuning or video circuits or combinations of such circuits. For example, control circuitry may include a display driver for driving display 212. Encoding circuitry (e.g., for converting over-the-air, analog, or digital signals to MPEG signals for storage) may also be provided. Control circuitry 204 may also include scaler circuitry for upconverting and downconverting media into the preferred output format of the user equipment 200. Control circuitry 204 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive data for widget 105. The circuitry described herein, including for example, the tuning, video generating, encoding, decoding, scaler, switching, display driver, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc). If storage 208 is provided as a separate device from user equipment device 200, the tuning and encoding circuitry (including multiple tuners) may be associated with storage 208.

A user may issue commands to the control circuitry 204 using user input interface 210. User input interface 210 may be any suitable user interface, such as a remote control, mouse, trackball, keypad, keyboard, touch screen, touch pad, stylus input, joystick, voice recognition interface, or other user input interfaces. Display 212 may be provided as a stand-alone device or integrated with other elements of user equipment device 200. Display 212 may be one or more of a monitor, a television, a liquid crystal display (LCD) for a mobile device, or any other suitable equipment for displaying visual images (e.g., an e-ink display). In some embodiments, display 212 may be HDTV-capable. Speakers 214 may be provided as integrated with other elements of user equipment device 200 or may be stand-alone units. The audio component of videos and other media content displayed on display 212 may be played through speakers 214. In some embodiments, the audio may be distributed to a receiver (not shown), which processes and outputs the audio via speakers 214.

It should be understood that user equipment 200 may be a representation of, or implemented within, user equipment 108 of FIG. 1, and may, in some approaches, run widget 105. Furthermore, as mentioned above in connection with FIG. 1, user equipment 200 may include a set-top box communicatively coupled to a television. In this embodiment, widget 105 may be implemented on the set-top box, the television, or both.

Figure 3:
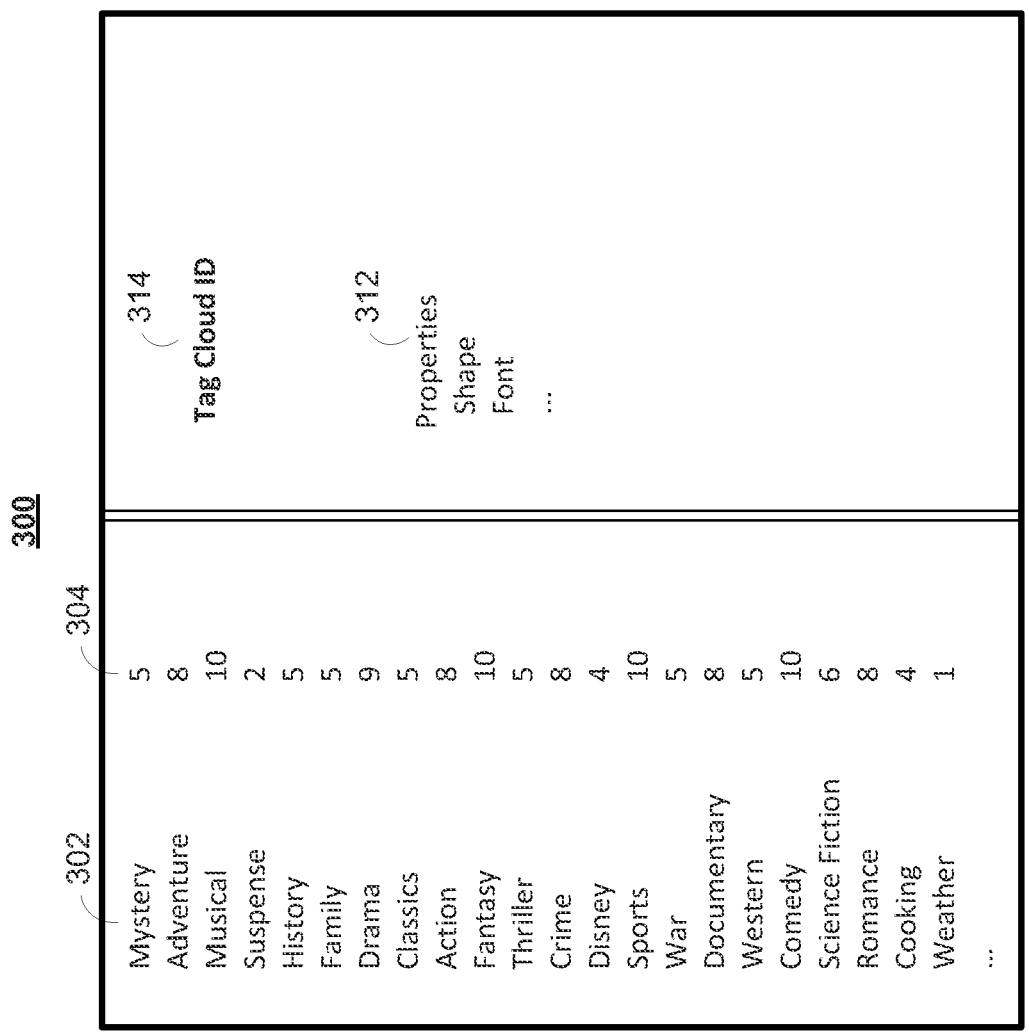
FIG. 3 illustrates an exemplary taste profile containing media content attributes indicating a user's media content preferences in accordance with some embodiments of the present invention.

FIG. 3 illustrates an exemplary taste profile 300 containing media content attributes 302 indicating a user's media content preferences in accordance with an embodiment of the present invention. Taste profile 300 may be stored as a data structure (e.g., in an XML file as illustrated in FIG. 14) and/or as part of a user preference profile stored in a database (e.g., database 112 of FIG. 1). Taste profile 300 may include any number of media content attributes of interest to a user. In some embodiments, taste profile 300 may categorize media content attributes by media category, e.g., as a movie preference or a music preference. Taste profile 300 may include particular media content attributes, for example, indicating the user prefers action movies and jazz music. It should be understood that taste profile 300 can include any number of media content attributes for any number of media categories. For example, taste profile 300 may also include gaming preferences. In addition, the particular attributes depicted in FIG. 3 are exemplary only and are not intended to be limiting. Media content attributes may include actor, artist, title, length, theme, mood, or any other suitable descriptive text.

In an embodiment, each of the media content attributes 302 may be associated with a weighting factor 304. The weighting factor may indicate a degree of user interest in a particular attribute. For example, a weighting factor in a range of one to ten may be assigned to each attribute, where a value of one indicates the least amount of user interest in the attribute and a value of 10 indicates the highest. Of course, any span of numerical values may be used. Two or more attributes may be assigned the same weighting factor indicating an equal interest in those attributes. In an embodiment, taste profile 300 may include attributes with a weighting factor of zero to indicate the user has no preference for that attribute. In another embodiment, that weighting factor may also indicate a level of undesirability. For instance, weighting factors may be negative numbers, such that large negative numbers indicate increasingly undesirable attributes.

Taste profile 300 containing media content attributes 302 may be produced, for example, based on direct user input and/or monitoring of user interaction with a media system or web site. Similarly, direct user input and/or monitoring may be used to assign weighting factors to attributes. In an embodiment, taste profile 300 may also include data specifying user preference tag cloud properties 312. As discussed above, a taste profile may be used to generate a user preference tag cloud, where the text of the tag cloud is formed from the media content attributes stored in the taste profile. The user preference tag cloud may be generated in a specific shape or may have certain geometric limitations. The text of the user preference tag cloud may also be displayed with certain font characteristics, e.g., all text may be the color blue. These properties and any other suitable properties may be set within the taste profile as properties 312.

Taste profile 300 may include identifier 314 specifying a title, label, or category assigned to the taste profile. For example, identifier 314 may include a title assigned to the taste profile by the user, e.g., "David's Exercise Music Profile." As another example, identifier 314 may specify a category such as "Movie Preferences" or "Music Preferences." Identifier 314 may also include data indicating that taste profile 300 is associated with the preferences of a particular user. For example, identifier 314 may include a unique identifier associated with the user, the user's name, or a link to a data record containing information about the user. It should be understood that identifier 314 may include any suitable information identifying taste profile 300 or its associated user.

Figure 4:
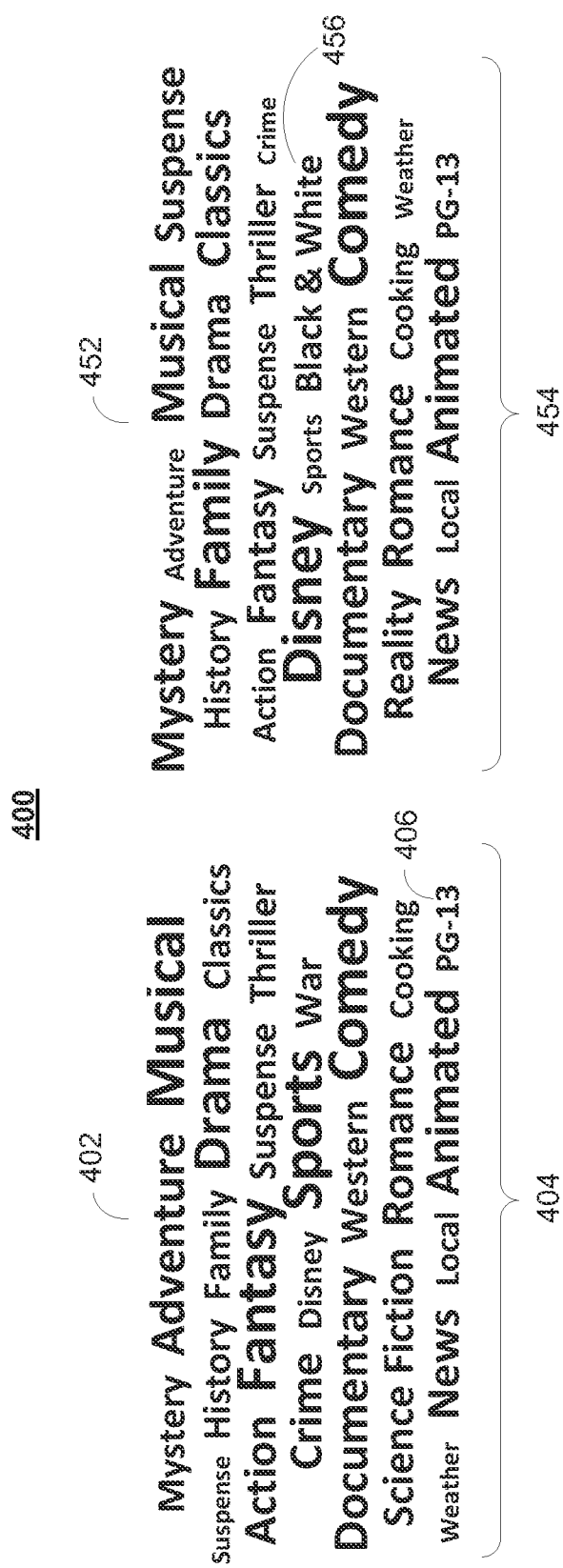
FIG. 4 shows an exemplary display screen depicting two user preference tag clouds in accordance with some embodiments of the present invention.

FIG. 4 illustrates an exemplary display screen 400 depicting two user preference tag clouds in accordance with an embodiment of the present invention. Each of tag clouds 402 and 452 are based on taste profiles containing media content attributes. Specifically, the media content attributes 404 are derived from the taste profile associated with tag cloud 402, while media content attributes 454 are derived from the taste profile associated with tag cloud 452. The media content attributes have font characteristics based on the information stored within the associated taste profile. The font size of each attribute, for example, is based on that attribute's weighting factor. The color of the attributes may be specified in the taste profile or set based on user information (e.g., gender). As shown, each tag cloud may also be displayed with identifying information, such as a title identifying the associated user.

In one embodiment, user preference tag clouds 402 and 452 may be associated with the same user. For example, a user may maintain multiple taste profiles reflecting the user's different moods or activities. In another embodiment, user preference tag clouds 402 and 452 may be associated with different users. It is contemplated that taste profiles may be generated, stored and shared amongst users. For example, a taste profile may be stored as a digital file (e.g., in an XML file as illustrated in FIG. 14) that may be attached to an email or uploaded to a file-sharing or social networking service. When a user requests to view the taste profile, for example, by opening the file or accessing a web site providing the taste profile, the user may be presented with the corresponding user preference tag cloud.

In an embodiment, a user may view multiple user preference tag clouds simultaneously on a display screen, as shown in FIG. 4. As discussed, these user preference tag clouds may correspond to taste profiles that each "belong" to the user (i.e., they may have been created by the user or automatically generated on the user's behalf), or one may belong to the user while the other belongs to another user. The user may then be provided with the ability to compare and edit the underlying taste profile via the user preference tag clouds.

In one approach, the user may initiate a request to compare the taste profiles, or a comparison may be conducted automatically, e.g., in response to the user accessing display screen 400. A comparison of taste profiles may involve comparing each of the media content attributes stored in one taste profile to the media content attributes of the other taste profile to determine matching attributes and/or non-matching attributes. In addition, the comparison may result in a determination, for each taste profile, of which attributes in the other taste profile are not currently stored in the given taste profile. The results (i.e., the differences or similarities between the taste profiles) of the comparison may be presented by highlighting or otherwise varying a display or font characteristic of one or both of the user preference tag clouds. For example, in one scenario, each media content attribute present in user preference tag cloud 452 that is not present in user preference tag cloud 402 may be highlighted within tag cloud 452. In another scenario, those media content attributes present in both tag clouds may be highlighted in tag cloud 402 and/or 452. As another example, each media content attribute not present in both tag clouds may be highlighted within the respective tag cloud. In an embodiment, a list may be displayed with the results of the comparison, e.g., a list of all attributes within tag cloud 452 not present in tag cloud 402.

In another approach, the user may edit one or both of the taste profile corresponding to user preference tag clouds 402 and 452. Generally, the user may interact with a user preference tag cloud to remove or add media content attributes thereby removing or adding the same media content attributes from the underlying taste profile. For example, the user may drag media content attributes out of user preference tag cloud 402 to remove them from the tag cloud and, hence, from the underlying taste profile (although, it should be understood that a user may decline to save changes, thereby retaining the original taste profile). The user may also remove attributes by selecting the attribute and requesting removal (e.g., via a menu or key press), or through any other suitable technique. Similarly, the user may add media content attributes to user preference tag cloud 402, for example, by typing directly into the tag cloud, by selecting a media content attribute from a list, or using any other suitable technique.

The user may also interact with a user preference tag cloud to change the location or weighting of an attribute. The user may, in some embodiments, interact with the tag cloud directly, e.g., by clicking and dragging the media content attributes. For instance, the user may be provided with the ability to modify the size of an attribute in the tag cloud by dragging a corner of the attribute. As another example, the user may be provided with the ability to modify the location of an attribute within the tag cloud by clicking within an attribute and dragging it to the desired location. The user may also change some other characteristic (e.g., style) of an attribute using any suitable interface (e.g., a menu or button displayed on the display screen in response to the user clicking on an attribute). The tag cloud may automatically readjust to accommodate these modifications. In some embodiments, the readjustment is real-time and dynamically displayed to the user.

In yet another approach, the user may transfer media content attributes between taste profiles. In an embodiment, a user may transfer media content attributes by dragging and dropping a media content attribute from one user preference tag cloud to another. For instance, a user may select media content attribute 456 within user preference tag cloud 452 and drag it into tag cloud 402. In response, tag cloud 402 may update to display a copy of media content attribute 456, and the media content attribute may be added to the underlying taste profile. When updating, tag cloud 402 may automatically readjust to accommodate the new media content attribute. For example, the tag cloud may expand in area, the attributes may be resized proportionately, or one or more existing attributes may be removed from the tag cloud. In the last scenario, the media content attribute(s) with the lowest weighting factor may be automatically selected for removal. Alternatively, the user may be prompted to indicate a media content attribute for removal.

In sum, when adding an attribute to a user preference tag cloud, whether directly or from another user preference tag cloud, the sizing, order, and/or placement of all the attributes of the target user preference tag cloud may be modified to accommodate the new attribute. Generally, the user preference tag cloud will automatically readjust to accommodate the addition or removal of attributes. In some embodiments, the readjustment is real-time and dynamically displayed to the user. The readjustment can include automatically scaling the font size of the attributes and/or rearranging the location of the attributes. Alternatively, or in addition, the readjustment can include automatic scaling of the tag cloud itself to reduce or increase the area available for attributes.

It should be understood that the user may repeat the process for adding and/or removing media content attribute as desired. For instance, the user may drag multiple media content attributes from user preference tag cloud 452 into tag cloud 402, thus adding multiple media content attributes to the taste profile corresponding to tag cloud 402. Newly added attributes may be indicated using any suitable display or font characteristic, such as a highlight. When tag clouds 402 and 452 have been compared and the results displayed, those results may automatically update as attributes are dragged from one tag cloud to the other. For example, media content attribute 456 may be initially highlighted to indicate its absence from user preference tag cloud 402. However, after being copied into tag cloud 402, the highlighting of media content attribute 456 may be removed.

In some embodiments, the weighting factor assigned to the copied media content attribute is the same as the weighting factor assigned to the source media content attribute. For example, when media content attribute 456 is copied into tag cloud 402, the weighting factor assigned to the copied media content attribute may be the same as the weighting factor assigned to attribute 456. In other embodiments, the weighting factor assigned to the copied attribute may revert to a default value. In either embodiment, the weighting factor may be adjusted after the media content attribute is inserted by increasing its size, as discussed above.

Graphical animation may be employed when adding, removing, relocating, or resizing media content attributes within a tag cloud. In particular, the media content attributes may move and shift into their new positions. The media content attributes, if resized, may similarly expand or contract smoothly. On less capable devices, the changes may be displayed as the system redraws the screen. Although interaction with tag clouds has been described above in terms of clicking and dragging, it should be understood that any suitable interface may be used with correspondingly suitable input effectuating the aforementioned actions. For instance, user input may be received via wireless keyboard or mouse, a remote control, or a touch-screen.

FIG. 4 demonstrates how two or more user preference tag clouds may provide the user with a user-friendly and compelling interface for specifying media content preferences that can be stored in a user profile and used for providing media content recommendations. Specifically, the ability to manipulate media content attributes and their associated weightings (e.g., in real-time) through interaction with the tag cloud ensures the user's taste profile accurately reflects the user's tastes. Moreover, the ability to copy media content attributes between taste profiles via user preference tag clouds allows the user to adapt his taste profile based on the tastes of other users (e.g., the user's friends). In this latter role, user preference tag clouds serve as gateway interfaces to external user data and may therefore be naturally incorporated into social networking services and other multi-user web sites.

Figure 5:
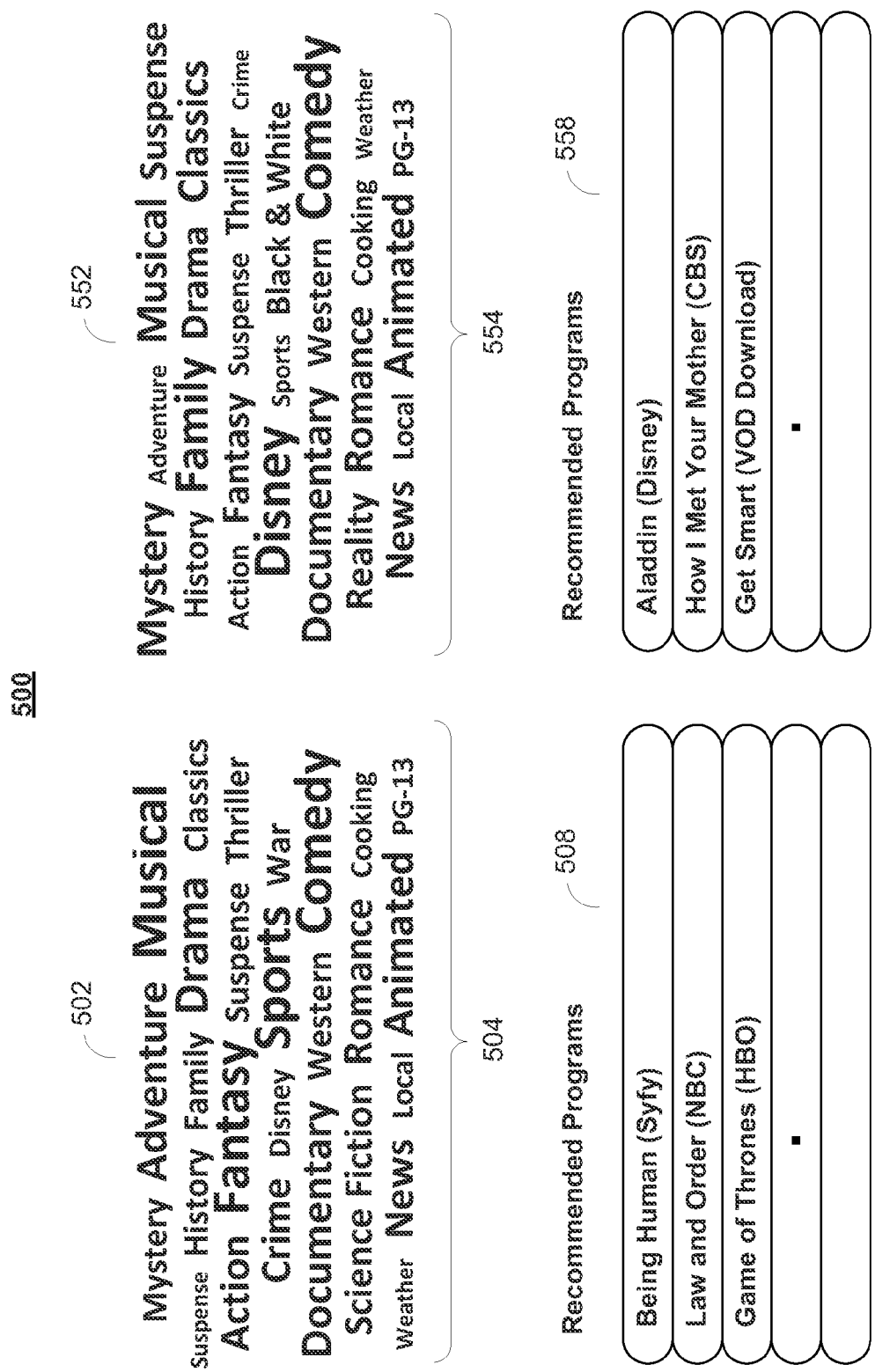
FIG. 5 shows an exemplary display screen that presents user preference tag clouds together with media content recommendations in accordance with some embodiments of the present invention.

FIG. 5 shows exemplary display screen 500 that presents user preference tag clouds 502 and 552 together with media content recommendations 508 and 558 in accordance with an embodiment of the present invention. Media content recommendations may be chosen based on the media content attributes displayed within a respective user preference tag cloud (i.e., stored within a corresponding taste profile). Specifically, a recommendation engine (e.g., widget 105 of FIG. 1, or a media guidance application) may search through available media content (e.g., media listings) to locate content with attributes matching the media content attributes displayed in the user preference tag clouds. Thus, the user can immediately view and/or access the media recommendations that result from the respective set of media content attributes.

Thus, media content recommendations 508 are selected based on media content attributes 504 of user preference tag cloud 502. Similarly, media content recommendations 558 are selected based on media content attributes 554 of user preference tag cloud 552. As the media content attributes of a tag cloud are modified, as described above, the corresponding media content recommendations may update in real-time. For example, in response to dragging media content attribute 556 from tag cloud 552 to tag cloud 502, media content recommendations 408 may update to account for the new taste information. In particular, the recommendation engine may initiate a new search of available media content to locate content with attributes matching the media content attributes displayed in user preference tag cloud 502, including the newly copied attribute.

Media content recommendations 508 and 558 may also be selected based on the weighting factors associated with the media content attributes of user preference tag clouds 502 and 552, respectively, and/or ordered accordingly. Thus, the media content shown at the top of media content recommendations 508 and 558 may reflect media content with attributes matching those that appear in the largest font in tag clouds 502 and 552, respectively (i.e., the media content attributes with the largest weightings). Again, such a feature ties the appearance of the tag clouds to media content recommendations, thereby providing the user with insight into how the recommendations are being made, i.e., which media content attributes are being taken into account and how much weight each attribute is being given by the recommendation engine.

It is contemplated that users may retrieve and compare their taste profiles with those of other users who may have similar tastes. For example, a user may retrieve taste profiles of friends, classmates, or other acquaintances. Users may also wish to retrieve and compare their taste profiles with those of celebrities or critics. Users may entirely copy a taste profile of another user, or incorporate only certain media content attributes into their own profile, as discussed above. Taste profiles may be shared using any suitable means for sharing digital files, e.g., via email, web sites, social networking services, direct file transfers, etc. A user may also be provided with the ability to "subscribe" to a user's taste profile "stream," as discussed in connection with FIG. 6.

Figure 6:
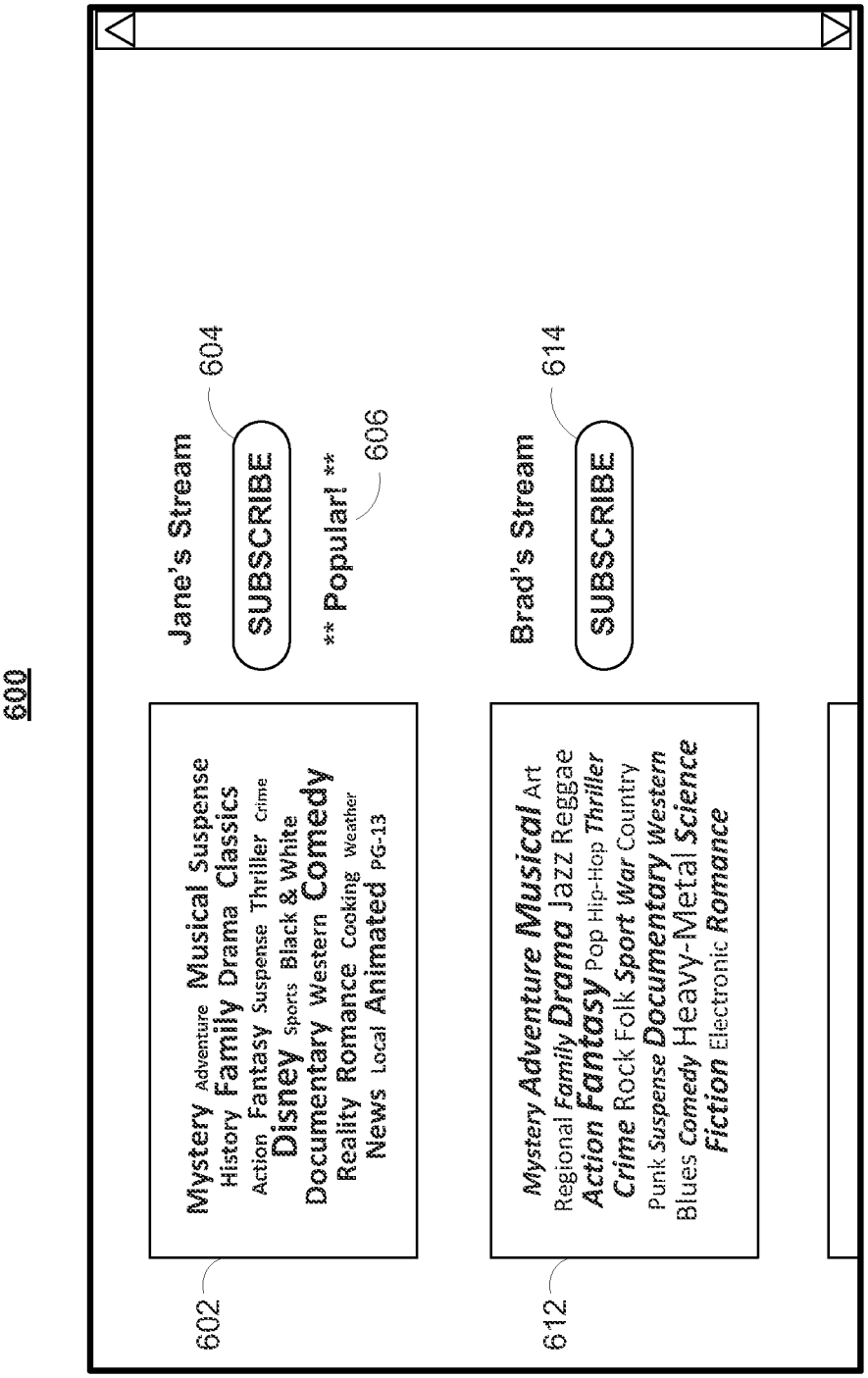
FIG. 6 shows an exemplary display screen that presents a list of user preference tag clouds available for subscription in accordance with some embodiments of the present invention.

FIG. 6 shows exemplary display screen 600 that presents a list of user preference tag clouds available for subscription in accordance with an embodiment of the present invention. User preference tag clouds 602 and 612 may correspond to publicly available taste profiles, e.g., as published to a web site. The user associated with the displayed tag clouds may be indicated, as shown. In addition, a button or other display element may provide the user with the ability to subscribe to the given taste profile stream (or "profile stream"). In FIG. 6, user preference tag cloud 602 is identified as "Jane's Stream" and the user may subscribe to the profile stream by selecting button 604. Similarly, user preference tag cloud 612 is identified as "Brad's Stream" and the user may subscribe to the profile stream by selecting button 614. Subscribing to a profile stream allows the user to stay current with changes as that taste profile evolves over time. A profile stream refers to a data stream that issues or updates each time the corresponding taste profile changes, and which indicates the incident change to the taste profile.

In one embodiment, subscribing to a taste profile ensures the user is notified of any changes to the taste profile, e.g., via an alert, email, text message, or other suitable notification. In another embodiment, subscribing to a taste profile ensures the user's own designated taste profile is automatically updated with any changes to the taste profile. Changes to a taste profile include the addition or removal of a media content attribute, or the change of a weighting factor associated with a media content attribute. For example, if the user subscribes to the taste profile associated with tag cloud 602, the user may thereafter be notified when media content attributes are added to or removed from the taste profile, or when a weighting factor is adjusted. As another example, if the user subscribes to the taste profile associated with tag cloud 612, the user's own taste profile may be modified thereafter when media content attributes are added or removed from the taste profile, or when a weighting factor is adjusted.

A user may subscribe to multiple profile streams associated with the same or different users. In addition, a user may indicate, for each subscription, actions to be taken upon receipt of a profile change. For example, the user may set an option to be notified of each change. As another example, the user may request that his taste profile be automatically updated with the change upon receipt. In this latter example, a user may also be provided with an option to select a specific taste profile as the target for the updates.

Referring again to display screen 600, subscriptions to published taste profiles may be tracked. Accordingly, indications of popularity may be displayed to the user. In one embodiment, the taste profiles listed in display screen 600 may be sorted according to popularity. In another embodiment, an icon or other display element, such as element 606, may be presented adjacent to popular taste profiles. As such, display screen 600 may become a "leader board" identifying users with especially desirable taste profiles, i.e., "leaders." These users may in turn be rewarded, e.g., with virtual or real prizes. In another embodiment, the taste profiles listed in display screen 600 may be sorted according to some suitable criteria, such as category or mood. Thus, the sorting may assist a user in finding taste profiles of particular interest.

In an embodiment, users are identified as leaders based on criteria other than the number of users subscribed to their taste profile(s). In one approach, leader status is derived using an algorithm scored by the weight of a number of variables, including depth of the user's viewing behavior, the number of subscribers to the user's taste profile, the type of content the user prefers, and/or information collected from external sources (e.g., social networking web sites).

It should be understood that in publishing a taste profile, a user may control who has access to view and/or subscribe to the taste profile. For example, a user may publish the taste profile on a web site accessible to the public, or to a social networking service where it may be accessible only to particular users. Profile publication may thus be limited to a user's circle of friends, a larger group of like-minded people, or a broad general audience. It should also be understood that, in connection with any of the embodiments described herein, a user may set permissions for a taste profile in order to control who may view (i.e., the corresponding tag cloud), interact with (e.g., in order to copy attributes), subscribe to, and/or modify the taste profile. For example, a user may allow viewing access to all users but restrict copy and subscription privileges to a select group of users, while reserving modification privileges to him or herself. Any suitable configuration of permissions may be selected by the user, and may be changed at any time. In some embodiments, the taste profile has an associated password, and a user may be required to enter the password in order to access the profile or view the corresponding tag cloud.

Figure 7:
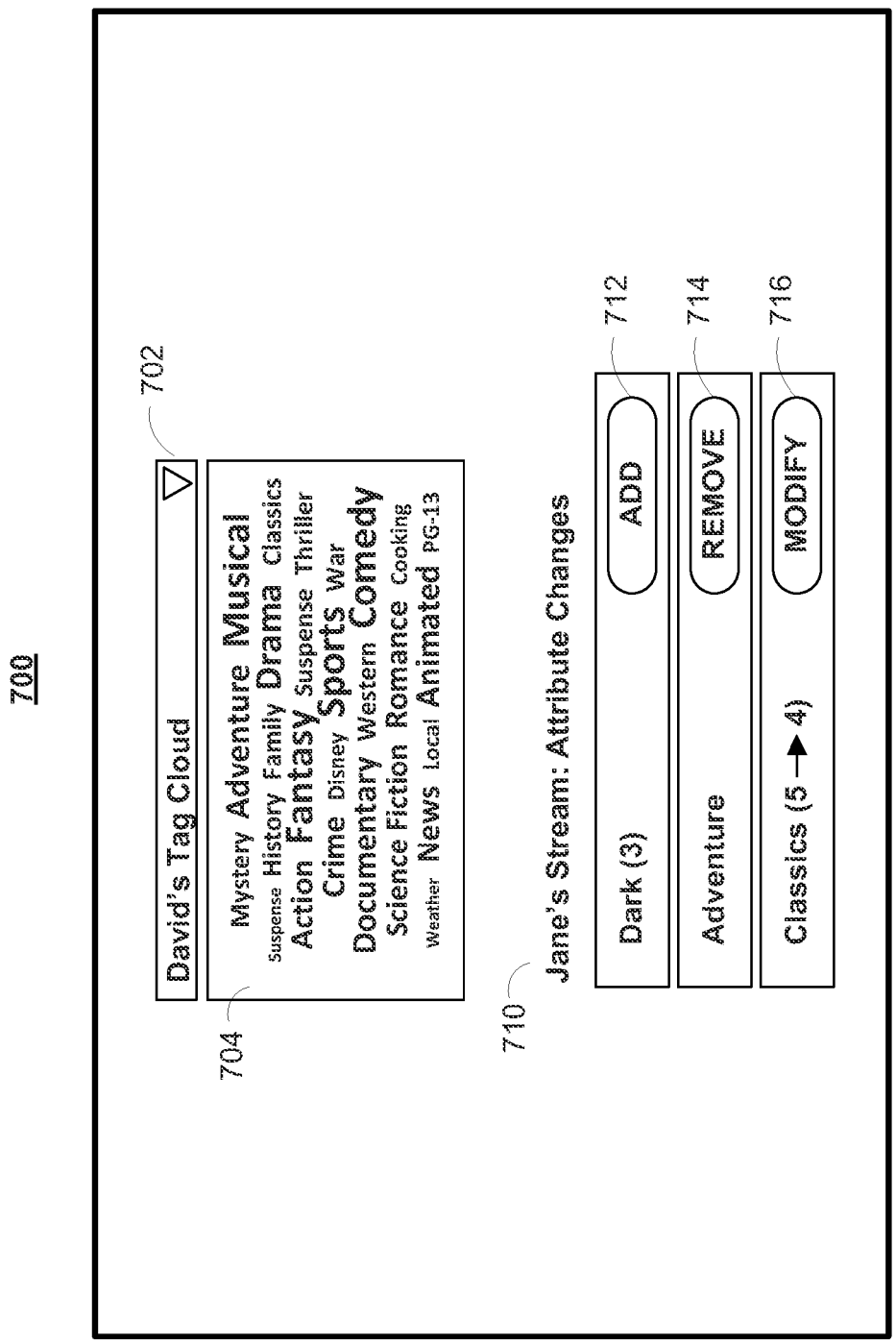
FIG. 7 shows an exemplary display screen that presents a list of changes received from a profile stream in accordance with some embodiments of the present invention.

FIG. 7 shows exemplary display screen 700 that presents a list 710 of changes received from a profile stream in accordance with an embodiment of the present invention. Display screen 700 allows a user to control which updates from a profile stream are incorporated into a taste profile. As shown, the user can select a target taste profile from dropdown box 702. The target taste profile, in one approach, may be any taste profile associated with the user. A user preference tag cloud 704 associated with the selected taste profile may also be displayed. User preference tag cloud 704 provides a reference to the user in order to facilitate the user's decision on whether to adopt the listed changes. In an embodiment, user preference tag cloud 704 displays updates to the taste profile in real-time.

List 710 presents the latest changes received from the profile stream. The changes may involve adding, removing, or changing the weighting factor of a media content attribute. In each case, the media content attribute affected is displayed and, where appropriate, the weighting factor to be applied is indicated. Each change may be individually applied, allowing the user to discriminate amongst updates. As shown, some changes may be additions to the profile and the user may be provided with a button 712 to add the relevant media content attribute to the selected taste profile. Some changes, on the other hand, may be deletions from the profile and the user may be provided with a button 714 to remove the relevant media content attribute from the selected taste profile. Finally, the profile stream may indicate a change to the weighting factor of an existing media content attribute and the user may be provided with a button 716 to make the same modification to his own taste profile. Since a user may make discriminatory decisions as to which updates to accept, and may manually update his taste profile, it is possible that later updates will be inapplicable to the user. For example, the profile stream may indicate that an attribute should be deleted, but that attribute may have been previously removed by the user or never added in the first place. In those circumstances, the update may not be presented to the user.

In response to selecting buttons 712, 714 or 716, the taste profile represented by user preference tag cloud 704 is updated accordingly. That is, an attribute is added, removed, or weighted differently within the taste profile. User preference tag cloud 704 may update in like fashion, e.g., using an animation or other visual cue. As discussed above, the existing attributes may be resized in order to accommodate an addition, removal, or weighting change. In an embodiment, one or more attributes may be removed in order to accommodate an added attribute. A user may also be provided with an option (not shown) to dismiss an attribute change in list 710. In response to the selection of the dismiss option, the corresponding item may be removed from display screen 700.

Figure 8:
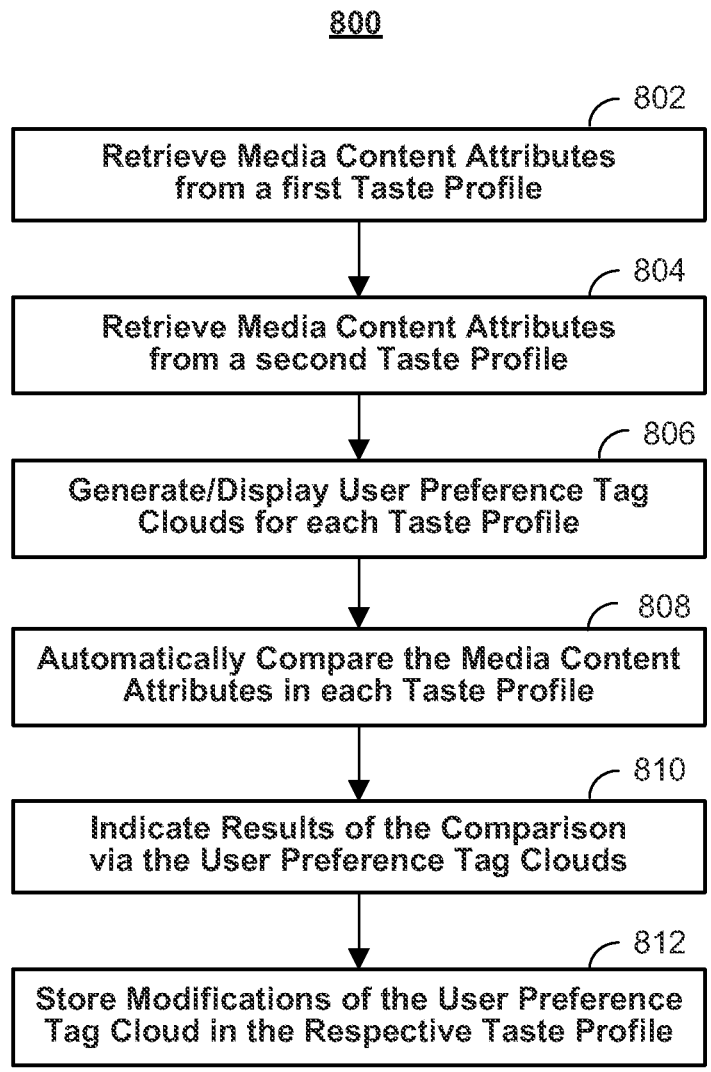
FIG. 8 illustrates a flow chart of an exemplary process for comparing and/or updating a taste profile in accordance with some embodiments of the present invention.

Turning to FIG. 8, illustrative flow chart 800 is shown depicting an exemplary process for comparing and/or updating a taste profile in accordance with some embodiments of the present invention. At step 802, media content attributes are retrieved from a user's taste profile. For instance, a database may be accessed to retrieve media content attributes from a user's taste profile. The taste profile may be stored at user equipment (e.g., user equipment 108 of FIG. 1), in an external database (e.g., databases 112 of FIG. 1), or at any other suitable location. At step 804 media content attributes are retrieved from another taste profile. The second taste profile may be another taste profile belonging to the user, or it may be a taste profile belonging to a different user. Step 804 may be initiated in response to receiving a user request to access a second taste profile. For example, a user may have selected a taste profile by clicking on the corresponding user preference tag cloud on a web site.

At step 806, a user preference tag cloud is generated for each taste profile using the retrieved media content attributes. Each media content attribute may be sized according to its associated weighting factor (also stored in the taste profile). In addition, the media content attributes of each tag cloud may displayed in a different color (or other font characteristic) in order to visually distinguish the tag clouds. In some embodiments, the color of the media content attributes is dictated by preferences stored in the taste profile, e.g., preferences 312 of FIG. 3. The generated user preference tag clouds may then be displayed to the user, e.g., in display screen 500 of FIG. 5. Each tag cloud may be accompanied by an indicator identifying its associated taste profile, e.g., the user's name or a title assigned to the taste profile.

At step 808, the taste profiles may be compared, either automatically or in response to a user request. As described above, taste profile comparison may involve a one-to-one comparison of media content attributes stored in each profile. The results of the comparison may indicate which attributes are contained in both taste profiles, which attributes are contained only in the first profile, and/or which attributes are contained only in the second profile. At step 810, these results are displayed via the user preference tag clouds. For instance, common attributes may be highlighted while all other attributes are displayed without highlighting, or vice versa. The highlighting may be displayed in both user preference tag clouds or only in one. Of course, another display technique other than highlighting may be employed for this purpose.

Upon viewing the comparison results the user may interact with the tag clouds to manipulate the media content attributes. Specifically, the system may receive a user input request to modify the user preference tag clouds (e.g., via user input interface 210 of FIG. 2). As described above, in one embodiment, the user may interact with the tag clouds directly to rearrange, resize, add, remove, or otherwise modify attributes. For example, the user can drag and drop attributes into, out of, and around the tag cloud, thereby adding, removing, and rearranging attributes, respectively. As another example, the user can resize an attribute by dragging its corner or a border surrounding the attribute (which may appear when the attribute has the focus). As yet another example, a user may modify font characteristics of an attribute in the tag cloud by selecting that attribute (e.g., double-clicking the attribute) and setting font characteristics (e.g., in a dialog box). It should be understood that these examples only illustrate a few techniques for interacting with and modifying the tag cloud and its attributes, and are not intended to be limiting. It is contemplated that other known techniques for manipulating text and objects may be adapted for the purpose of adjusting a tag cloud.

In addition to adjusting the size of attributes, or adding and deleting attributes, a user may also copy an attribute from one tag cloud to the other. At step 812, the user's taste profile is updated to store any and all of these modifications to the tag cloud. The updated taste profile may be stored back at user equipment 108, databases 112, or servers 122 of FIG. 1. In an embodiment, the user preference tag cloud may be posted to a user's social networking page or other web site. In this manner, the user's taste profile is kept in synch with the user preference tag cloud, and enables the tag cloud to act as a user interface for modifying the underlying taste profile.

Figure 9:
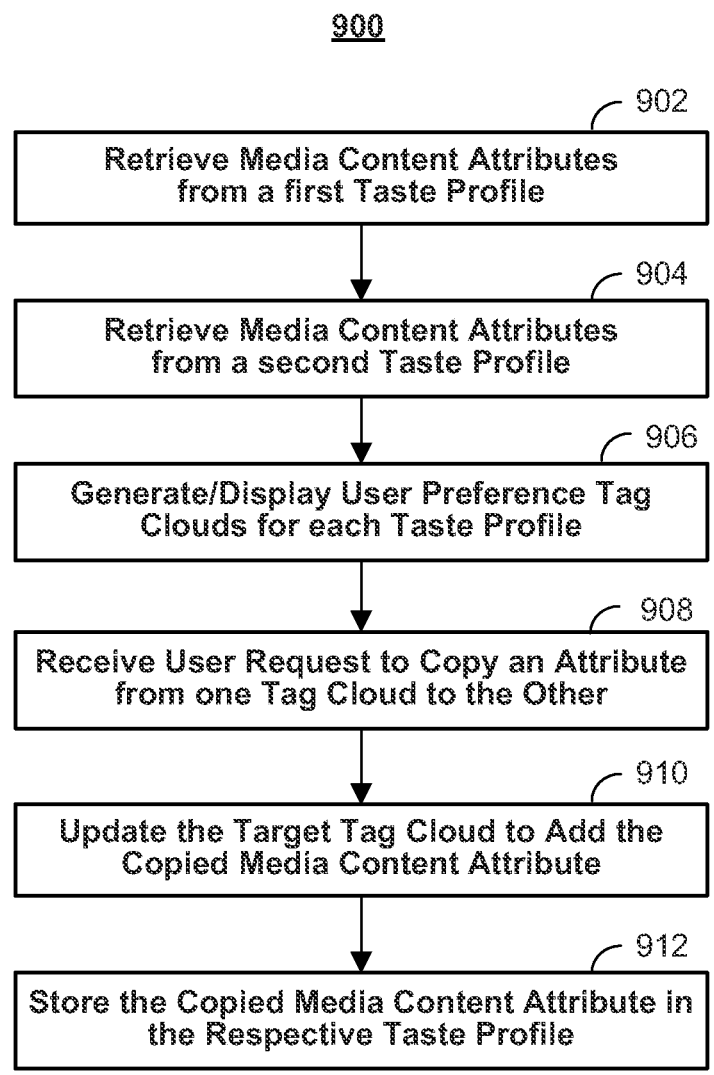
FIG. 9 illustrates a flow chart of an exemplary process for copying media content attributes between taste profiles in accordance with some embodiments of the present invention.

Turning to FIG. 9, illustrative flow chart 900 is shown depicting an exemplary process for copying media content attributes between taste profiles in accordance with some embodiments of the present invention. At step 902, media content attributes are retrieved from a user's taste profile. For instance, a database may be accessed to retrieve media content attributes from a user's taste profile. The taste profile may be stored at user equipment (e.g., user equipment 108 of FIG. 1), in an external database (e.g., databases 112 of FIG. 1), or at any other suitable location. At step 904 media content attributes are retrieved from another taste profile. The second taste profile may be another taste profile belonging to the user, or it may be a taste profile belonging to a different user. Step 904 may be initiated in response to receiving a user request to access a second taste profile. For example, a user may have selected a taste profile by clicking on the corresponding user preference tag cloud on a web site.

At step 906, a user preference tag cloud is generated for each taste profile using the retrieved media content attributes. Each media content attribute may be sized according to its associated weighting factor (also stored in the taste profile). In addition, the media content attributes of each tag cloud may be displayed in a different color (or other font characteristic) in order to visually distinguish the tag clouds. In some embodiments, the color of the media content attributes is dictated by preferences stored in the taste profile, e.g., preferences 312 of FIG. 3. The generated user preference tag clouds may then be displayed to the user, e.g., in display screen 500 of FIG. 5. Each tag cloud may be accompanied by an indicator identifying its associated taste profile, e.g., the user's name or a title assigned to the taste profile.

At step 908, a user request to copy a media content attribute from one tag cloud to the other may be received. Specifically, the user may indicate a desire to copy an attribute from the user preference tag cloud associated with the second taste profile to the first taste profile. In one approach, the user may initiate this request using a drag-and-drop interaction, i.e., by dragging an attribute from one tag cloud into the target tag cloud. However, any suitable technique may be implemented to allow the user to copy over attributes between tag clouds. At step 910, the target user preference tag cloud is updated to display the copied media content attribute. To accommodate the new attribute, the existing attributes may shift and/or resize, one or more attributes may be removed, or the tag cloud may expand.

At step 912, the copied media attribute is stored in the taste profile associated with the modified tag cloud. In turn, the taste profile may be stored back in user equipment 108, databases 112, or servers 122 of FIG. 1. In an embodiment, the user preference tag cloud may be posted to a user's social networking page or other web site. In addition, if another user has subscribed to the taste profile, that user may be notified of the change via a profile stream, as discussed above.

Figure 10A:
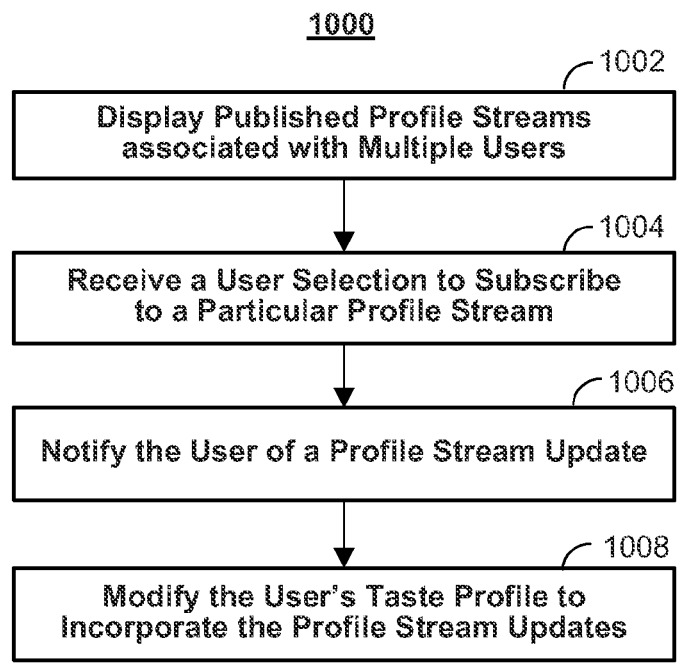
FIG. 10A illustrates a flow chart of an exemplary process for subscribing to a profile stream in accordance with some embodiments of the present invention.

Turning to FIG. 10A, illustrative flow chart 1000 is shown depicting an exemplary process for subscribing to a profile stream in accordance with some embodiments of the present invention. At step 1002, published profile streams from any number of users may be displayed. For example, a list of profile streams may be presented as shown in FIG. 6. A user may then select a profile stream from the list, e.g., using a button. At step 1004, the user selection is received together with an indication of the desired profile stream and a record of the subscription may be stored. For example, a record of the subscription may be stored in a database or remote server (such as servers 122 of FIG. 1).

A profile stream may issue data indicating a change to the underlying taste profile each time an attribute is added, removed, or modified. At step 1006, the user is notified of a profile stream update. In one approach, this notification takes the form of an alert or an entry is added to a list of changes. In another approach, the notification is internal and triggers an update to the user's taste profile. At step 1008, the user's taste profile is updated to incorporate the profile stream updates, either automatically or in response to a user request.

Figure 10B:
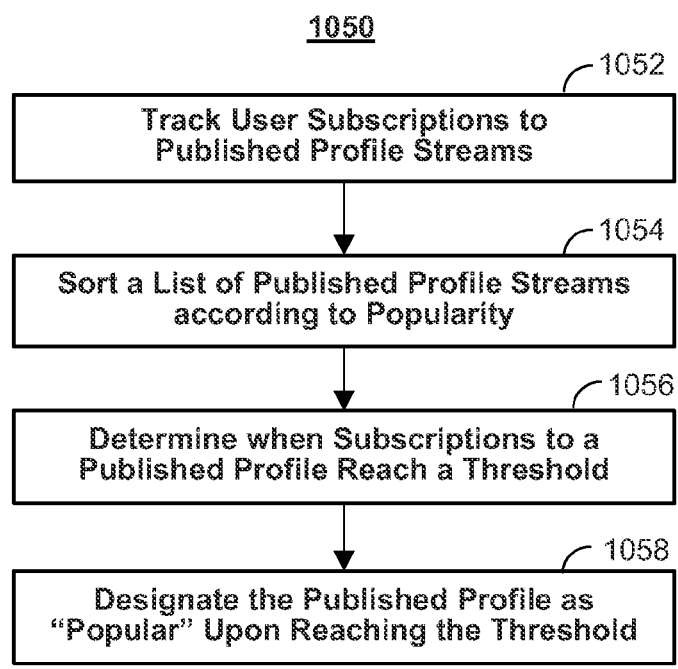
FIG. 10B illustrates a flow chart of an exemplary process for tracking profile stream subscriptions in accordance with some embodiments of the present invention.

Turning to FIG. 10B, illustrative flow chart 1050 is shown depicting an exemplary process for tracking profile stream subscriptions in accordance with some embodiments of the present invention. At step 1052, user subscriptions are monitored and tracked for each published profile stream. For example, a web site may be maintained offering a number of profile streams corresponding to taste profiles published by users. Subscriptions to these profile streams may be tracked such that the number of subscriptions to each published profile is stored, e.g., at a remote server. This data may be used in a number of ways. For instance, at step 1054, a list of published profiles may be displayed to users sorted by popularity. Popularity may be calculated as a function of the number of subscriptions for each published profile stream. Thus, the list may display profile streams commanding the most subscriptions at the top of the list. Additionally, or alternatively, subscription data may be used to determine when subscriptions for a particular profile stream have exceeding a threshold number, as required by step 1056. When the threshold is reached, at step 1058, those profile streams may be labeled or otherwise indicated as popular. Thus, users may be provided with an easily identifiable indicator of which published profile streams are of most interest to the population of users.

Figure 11:
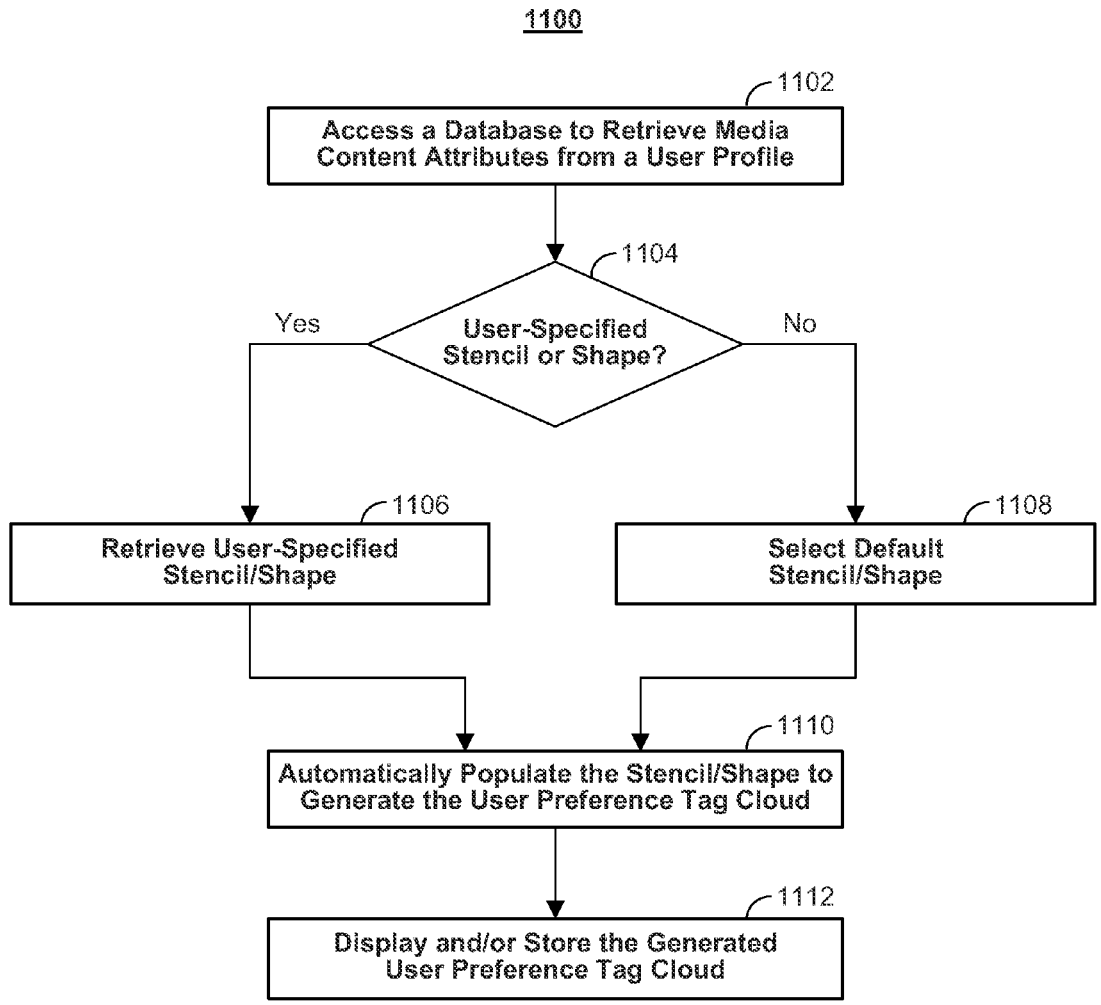
FIG. 11 illustrates a flow chart of an exemplary process for generating and/or displaying a user preference tag cloud in accordance with some embodiments of the present invention.

Turning to FIG. 11, illustrative flow chart 1100 is shown depicting an exemplary process for generating and/or displaying a user preference tag cloud in accordance with some embodiments of the present invention. For example, the steps shown in flowchart 1100 may be executed as part of the tag cloud generation process of steps 806 and 906 of FIGS. 8 and 9, respectively. At step 1102, media content attributes are retrieved from a user profile (i.e., a taste profile). The user profile may be stored within user equipment (e.g., within storage 208 of FIG. 2), in an external database (e.g., databases 112 of FIG. 1), or at any other suitable location. The media content attributes may be kept in memory during the tag cloud generation process, and/or may be written to a tag cloud file, e.g., file 1500 of FIG. 15.

As discussed above, each user preference tag cloud may be shaped differently, e.g., using different stencils. Stencils are outlines of figures or images that are used to create tag clouds by defining the dimensions and shape of an area to be populated by text (i.e., media content attributes). Alternatively, user preference tag clouds may be arranged according to a given shape (e.g., a circle, square, rectangle, etc.). When creating or modifying a taste profile, a user may have an opportunity to specify a desired shape or stencil for the corresponding user preference tag cloud. At step 1104 the process determines whether the user has specified a shape or stencil for the tag cloud. If the user has specified a desired shape or stencil, that shape or stencil is retrieved at step 1106. For a stencil, retrieval may include accessing the stencil from a database or remote server. However, any suitable technique for locating, selecting, extracting, or otherwise generating a stencil may be employed. If, however, the user has not specified a desired shape or stencil, a default shape or stencil is selected at step 1108. The default may be predetermined, or automatically selected based on the user profile information.

Figure 12:
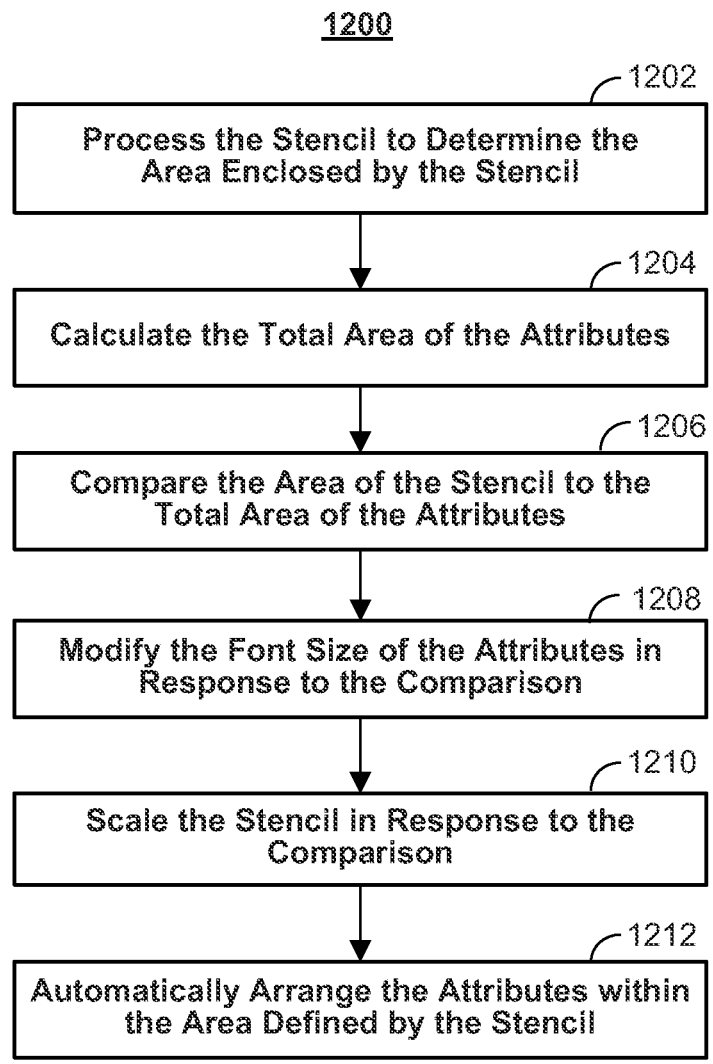
FIG. 12 illustrates a flow chart of an exemplary process for populating a stencil to generate a user preference tag cloud in accordance with some embodiments of the present invention.
Figure 13A:
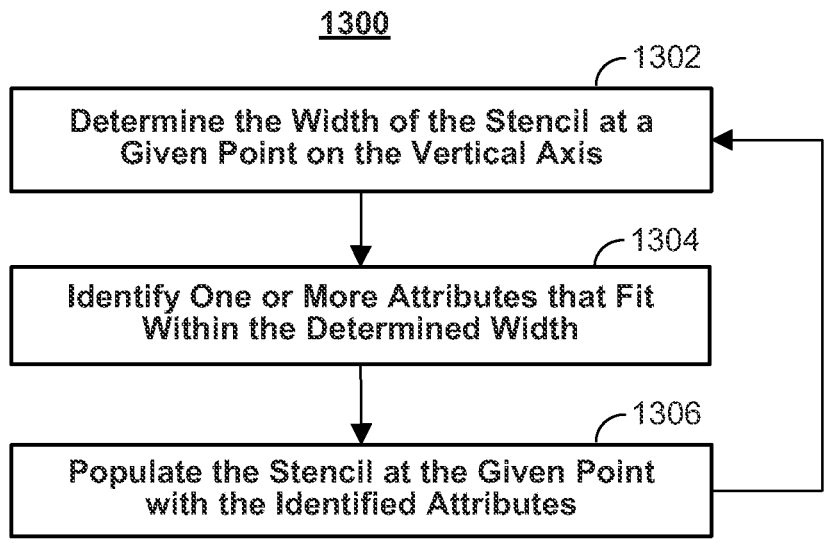
FIG. 13A illustrates a flow chart of an exemplary process for arranging attributes within a stencil in accordance with some embodiments of the present invention.
Figure 13B:
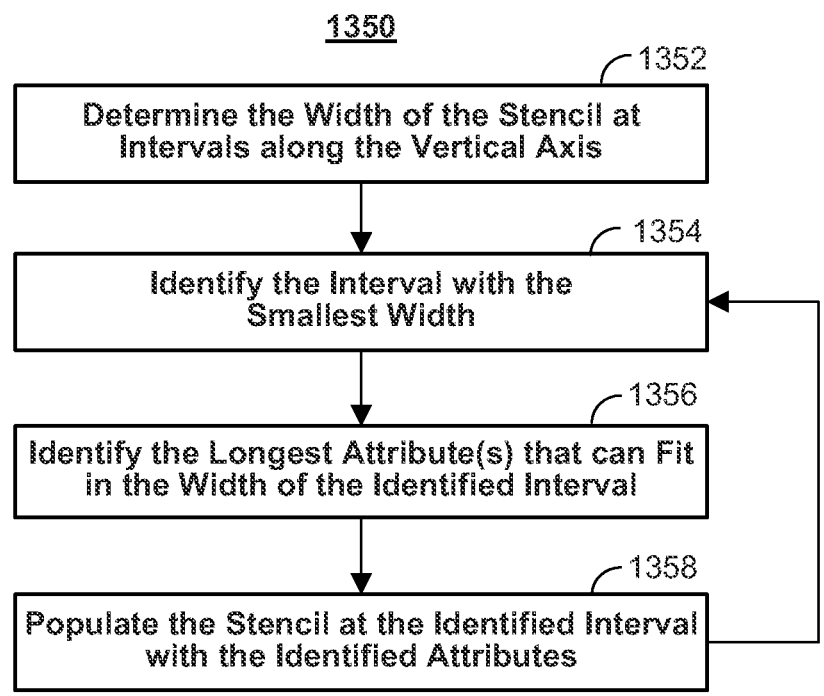
FIG. 13B illustrates a flow chart of another exemplary process for arranging attributes within a stencil in accordance with some embodiments of the present invention.

Hereinafter, for ease of description, reference to shapes and stencils will be substantially limited to stencils. It should be understood, however, that the methods, techniques, and features described below apply equally to shapes. At step 1110, the stencil is automatically populated with the media content attributes retrieved from the user profile in step 1102. As discussed above, the stencil is used to define the outer borders of a tag cloud. Populating the stencil may therefore include setting the font characteristics of the attributes and distributing the attributes within the borders defined by the stencil, such that the final arrangement of text appears in the same shape as the stencil. Examples of this process are depicted in the flowcharts of FIGS. 12, 13A and 13B, which are described below in greater detail. The generated user preference tag cloud is the final arrangement of attributes within the stencil that results from the stencil populating process.

At step 1112, the user preference tag cloud is stored and/or displayed. In particular, the generated user preference tag cloud may be stored at user equipment 108, databases 112, or servers 122 of FIG. 1. In an embodiment, the user preference tag cloud may be posted to a user's Facebook page or other web site. Alternatively, or in addition, the generated user preference tag cloud may be displayed on a display screen. For example, the tag cloud may be displayed to the user within a media guidance application or web site, as depicted in FIGS. 4-7. It should be understood that a user preference tag cloud need not be generated each time it is displayed. Once a user preference tag cloud has been generated and stored (e.g., as file 1500 of FIG. 15), it may be accessed for display directly from storage.

FIG. 12 illustrates a flow chart 1200 of an exemplary process for populating a stencil to generate a user preference tag cloud in accordance with some embodiments of the present invention. The process represented by flow chart 1200 may be incorporated in whole or in part into step 1110 of FIG. 11. At step 1202, the area enclosed by the stencil to be used in generating the tag cloud is determined, e.g., by processing the stencil. This area may be calculated, for example, by dividing the stencil into intervals along its vertical axis and summing the areas of each of the intervals, the latter of which may be calculated by multiplying the width of the stencil at the location of the interval by the height of the interval. The number of intervals can be chosen to optimize processing speed or accuracy, and may be any suitable number. This technique of calculating area is only exemplary and it should be understood that any suitable technique may be used.

At step 1204, the total area of the attributes which are to constitute the user preference tag cloud is determined. The area of an attribute may be calculated using the font size of the attribute and the number of characters in the attribute text (and other font characteristics). Alternatively, the area of an attribute may be determined by drawing a rectangle tightly around the attribute and multiplying the height of the rectangle by its width. Of course, these techniques are only exemplary and any suitable method of measuring the area of text may be used instead. The areas of all the attributes are summed to calculate the total area of the attributes. In some embodiments, spacing between the individual attributes may be added into the total area calculation.

In one embodiment, the areas of the attributes are calculated after their font characteristics have been appropriately set. In particular, each attribute's font size may be scaled according to its assigned weighting factor relative to a standard font size. Accordingly, the area calculated for each attribute may include a measure of that attribute's display size relative to the other attributes. In another embodiment, the areas of the attributes are calculated before their font characteristics have been appropriately set, i.e., the areas are based on a standard font size and vary only with the length of the attribute text. This approach may be useful in cases where each attribute is displayed in the same font face and size, or in cases where the effects of the attribute font characteristics are independently calculated and added to the total area measurement.

In one embodiment, the area of the stencil calculated in step 1202 sets the maximum area into which the attributes must fit. The total area of the attributes calculated in step 1204, including spacing, must therefore be less than the area of the stencil calculated in step 1202. Accordingly, at step 1206, the area of the stencil calculated in step 1202 is compared with the total area of the attributes calculated in step 1204 to ensure this condition is met. If it is, then the process may skip to step 1212, where the attributes are arranged within the area defined by the stencil. The difference between the two areas may be used as spacing between the attributes. Alternatively, the process may proceed with step 1208, where the font size of the attributes may be modified so as to increase the total area of the attributes, including spacing, to just less than the area of the stencil. In this manner, the attributes will take up a maximal amount of space within the stencil and the resulting tag cloud will better convey the shape of the stencil. Once the attribute size is set in step 1208, the process may proceed with step 1212, where the attributes are arranged within the stencil area.

If, however, the total area of the attributes is not less than the area of the stencil, as determined in step 1206, the process may proceed with step 1208. At step 1208, the size of the attributes may be modified so as to decrease the total area of the attributes, such that the total area, including spacing, is just less than the area of the stencil. In this manner, the attributes will take up a maximal amount of space, but within the area defined by stencil. Once the attribute size is set in step 1208, the process may proceed with step 1212, where the attributes are arranged within the stencil area.

Modification of attribute size in step 1208 may be performed on the attributes as a whole or on an attribute-by-attribute basis. In the former approach, each attribute may be scaled the same amount as necessary to achieve a desired total area. In the latter approach, all attributes of a particular initial size may be scaled together without affecting attributes of other sizes. For instance, the largest attributes may be scaled down to a size less than their initial size, but still reflective of their relative importance. In yet another approach, the least important attribute (i.e., with the lowest weighting) is altogether removed when the total area of the attributes must be reduced; and, similarly, such an attribute may be added when the total area of the attributes must be increased. In still another approach, one or more particular attributes may be resized, as needed, based on some criteria (e.g., the attributes are similar to each other). It should be understood that one or more of these approaches may be combined to achieve the overall desired effect on the total attribute area.

In another embodiment, the total area of the attributes calculated in step 1204 sets the minimum area required by the attributes. The area of the stencil calculated in step 1202 must therefore be greater than the total area of the attributes calculated in step 1204, including spacing. Accordingly, at step 1206, the area of the stencil calculated in step 1202 is compared with the total area of the attributes calculated in step 1204 to ensure this condition is met. If it is, then the process may skip to step 1212, where the attributes are arranged within the area defined by the stencil. The difference between the two areas may be used as spacing between the attributes. Alternatively, the process may proceed with step 1210, where the size of the stencil may be modified so as to reduce the total area of the stencil to just more than the total area of the attributes, including spacing. In this manner, the attributes will take up a maximal amount of space within the stencil and the resulting tag cloud will better convey the shape of the stencil. Once the stencil size is set in step 1210, the process may proceed with step 1212, where the attributes are arranged within the stencil area.

If, however, the area of the stencil is not greater than the total area of the attributes, as determined in step 1206, the process may proceed with step 1210. At step 1210, the size of the stencil may be modified so as to increase the area of the stencil, such that it is just greater than the total area of the attributes. In this manner, the attributes will take up a maximal amount of space, but within the area defined by the stencil. Once the stencil size is set in step 1210, the process may proceed with step 1212, where the attributes are arranged within the stencil area.

It should be understood that the two embodiments described above may also be used in combination. For example, both the font size of the attributes and the size of the stencil may be modified, i.e., the process may execute both steps 1208 and 1210. This may facilitate the production of a tag cloud with the closest fit to the stencil shape. It should be understood that the process may first execute step 1208 and then proceed to step 1210, or vice versa, or the process may iterate between the two steps as many times as necessary to achieve the desired result.

As described above, the attributes are automatically arranged within the area defined by the stencil (which have been modified in step 1210) at step 1212. Exemplary processes for arranging the attributes are depicted in FIGS. 13A and 13B. However, it is contemplated that other techniques and algorithms may be employed to suitably distribute the attributes within the stencil area. In some embodiments, more than one attribute arrangement technique may be employed and the best resulting tag cloud may be chosen.

Turning to FIG. 13A, illustrative flow chart 1300 is shown depicting an exemplary process for arranging attributes within a stencil in accordance with some embodiments of the present invention. The process represented by flow chart 1300 may be incorporated in whole or in part into step 1212 of FIG. 12. At step 1302, the width of the stencil is determined at a given point on the vertical axis of the stencil. In one approach, the process proceeds from the top of the stencil to the bottom, or vice versa, and the width is determined at given intervals. In another approach, the process begins with a point in the middle of the stencil and proceeds to determine widths at intervals above and below that point.

At step 1304, one or more attributes are identified that fit within the width determined in step 1302. In other words, the total length of the attributes, from end to end, does not exceed the width of the stencil at the given location. The process may iterate through all attributes not yet placed to select the best fitting attributes for the location, or the process may select the first of those attributes that satisfy certain criteria. Aside from not exceeding the width determined in step 1302, the criteria may include a minimum length of the attributes, such that the spacing from each end of the stencil is not too large. At step 1306, the stencil is populated with attributes identified in step 1304 at the given point. As discussed above, the resulting set of attributes is called a horizontal run of attributes. In some embodiments, after the attributes are selected for placement, their font characteristics may be modified slightly to better fit the location (e.g., the character spacing or font size may be slightly adjusted).

As shown in FIG. 13A, the above described process may repeat until the stencil is completely populated; that is, until every attribute has been placed within the stencil. The result is the user preference tag cloud.

FIG. 13B illustrates a flow chart 1350 of another exemplary process for arranging attributes within a stencil in accordance with some embodiments of the present invention. The process represented by flow chart 1350 may be incorporated in whole or in part into step 1212 of FIG. 12. At step 1352, the stencil may be divided into discrete intervals along the vertical axis of the stencil. For example, the stencil may be divided into intervals the size of a standard font height. The width of the stencil at the location of each of these intervals may then be determined.

At step 1354, the interval with the smallest width is identified. Then, at step 1356, the longest remaining attribute or set of attributes that fit within the width of the interval are selected. That is the fewest possible number of attributes are selected for the interval. The total length of the attributes, from end to end, must not exceed the width of the stencil at the location of the interval, but the length should be as close as possible to that width. At step 1358, the stencil is populated with attributes identified in step 1356 at the location of the identified interval. As discussed above, the resulting set of attributes is called a horizontal run of attributes. In some embodiments, after the attributes are selected for placement, their font characteristics may be modified slightly to better fit the location (e.g., the character spacing or font size may be slightly adjusted).

As shown in FIG. 13B, steps 1354 to 1358 may repeat until the stencil is completely populated; that is, until every attribute has been placed within the stencil. The result is the user preference tag cloud. Specifically, the process may identify the interval with the next smallest width and populate that interval with the fewest possible number of attributes.

FIG. 14 shows an illustrative example of a taste profile stored as a file 1400 in Extensible Markup Language (XML) in accordance with some embodiments of the invention. File 1400 may be an implementation of the taste profile 300 of FIG. 3. While shown as XML, file 1400 may alternatively be in another suitable markup language (e.g., HTML5) or file format (e.g., Flash). File 1400, as shown, may include tags and data specifying identification information (an ID number, a user entry, and a profile name), tag cloud preferences (shape, stencil, font, and color), and media content attributes (attribute names and weighting factors). The ID number may be used internally by the system to identify and/or track the taste profile. The ID number may also be used to link the taste profile to a user record in a database. For example, a user record may include the ID numbers of each taste profile belonging to the user. The user entry may specify the name of the user, which may be used to link back to the user record in the database. For example, the user entry may be used to locate the appropriate user record in the database. The profile name specifies a title for the taste profile, which may be used for display purposes, e.g., on display screen 700 of FIG. 7.

Continuing with FIG. 14, file 1400 includes tag cloud preferences. As discussed above, a taste profile may be used to generate a user preference tag cloud for display. Accordingly, the taste profile may include specification for the display characteristics of the tag cloud. As shown, file 1400 specifies a shape or stencil for use in setting the area and borders of the tag cloud. File 1400 also specifies the font and color of the attributes. These entries may each be set manually by the user, or they may be automatically determined from the user profile information associated with the user, e.g., user demographic information. Finally, file 1400 includes data specifying the user's tastes, i.e., media content attributes. As discussed above, each media content attribute may be associated with a weighting. Accordingly, file 1400 contains a listing, for reach attribute, of the attribute's name and the weighting factor associated with it. These attribute entries may be used to generate the contents of the user preference tag cloud.

FIG. 15 shows an illustrative example of a tag cloud stored as a file 1500 in Extensible Markup Language (XML) in accordance with some embodiments of the invention. File 1500 may be generated from a taste profile (e.g., as stored in file 1400 of FIG. 4). While shown as XML, file 1500 may alternatively be in another suitable markup language (e.g., HTML5) or file format (e.g., Flash). File 1500 may be produced automatically in response to a system request to display a tag cloud associated with a given taste profile. Alternatively, file 1500 may be generated at a suitable time, stored in a storage (e.g., databases 112 of FIG. 1 or storage 208 of FIG. 2), and retrieved when requested for display. File 1500, like file 1400, may include tags and data specifying identification information (an ID number, a user entry, and a tag cloud name), tag cloud preferences (font and color), and media content attributes (attribute names, font sizes, and location data). The ID number may be used internally by the system to identify and/or track the tag cloud. The ID number may also be used to link the tag cloud to a user record in a database. For example, a user record may include the ID numbers of each taste profile and/or tag cloud belonging to the user. The user entry may specify the name of the user, which may be used to link back to the user record in the database. For example, the user entry may be used to locate the appropriate user record in the database. The tag cloud name specifies a title for the tag cloud, which may be used for display purposes, e.g., on display screen 700 of FIG. 7. Upon generating file 1500, the ID, user and tag name entries may be automatically copied form the corresponding fields of file 1400.

Continuing with FIG. 15, file 1500 includes tag cloud preferences. As shown, file 1500 specifies the font and color of the media content attributes. These entries may each be set manually by the user, or they may be automatically determined from the user profile information associated with the user, e.g., user demographic information. The entries for font and color may be automatically copied, upon generating file 1500, from the corresponding fields of file 1400. Finally, file 1400 includes data specifying the contents of the user preference tag cloud, i.e., media content attributes. Each attribute listing may specify the attribute name, its font size, and its location (i.e., x-offset and y-offset) within the tag cloud region. When file 1500 is generated from file 1400 of FIG. 14, the attribute name field may be automatically copied from the corresponding field in file 1400, the font size may be calculated from the corresponding weighting field of file 1400, and the location data my be determined by the tag cloud generation process, which arranges the attributes within the tag cloud region.

It will be apparent to those of ordinary skill in the art that methods, techniques, and processes involved in the present invention may be embodied in a computer program product that includes a non-transitory computer usable and/or readable medium. For example, such a non-transitory computer readable medium may consist of a read-only memory device, such as a CD-ROM disk or conventional ROM devices, or a random access memory, such as a hard drive device or a computer diskette, having a computer readable program code stored thereon. It should also be understood, that methods, techniques, and processes involved in the present invention may be executed using processing circuitry. For instance, tag cloud generation, copying media content attributes between tag clouds, and other tag cloud processing features described herein may be performed by tag cloud processing circuitry, e.g., within one of servers 122 of FIG. 1 or control circuitry 204 of FIG. 2. The processing circuitry, for instance, may be a general purpose processor, a customized integrated circuit (e.g., an ASIC), or a field-programmable gate array (FPGA) within user equipment 108 or one of servers 122 of FIG. 1. The tag clouds may be generated from taste profiles stored in, and retrieved from, databases 112 of FIG. 1, or storage 208 of FIG. 2. Furthermore, tag cloud processing circuitry, or a computer program, may update the taste profiles by updating the information stored within databases 112 of FIG. 1 or storage 208 of FIG. 2.

It is to be understood that while certain forms of the present invention have been illustrated and described herein, it is not to be limited to the specific forms or arrangement of parts described and shown. Those skilled in the art will know or be able to ascertain using no more than routine experimentation, many equivalents to the embodiments and practices described herein. Accordingly, it will be understood that the invention is not to be limited to the embodiments disclosed herein, which are presented for purposes of illustration and not of limitation.

What is claimed is:

1. A method for interacting with multiple user profiles using a media guidance application implemented on a device, the method comprising:
   retrieving, from a database, a first user profile that stores a first set of media content attributes and a second user profile that stores a second set of media content attributes;
   generating, using tag cloud processing circuitry, a first tag cloud comprising the first set of media content attributes and a second tag cloud comprising the second set of media content attributes;
   receiving, with user input circuitry, a user indication from a first user to subscribe to the second user profile associated with the second tag cloud, wherein the first tag cloud is associated with the first user and the second tag cloud is associated with a second user;
   in response to receiving the user indication to subscribe to the second user profile, detecting a change in the second user profile;
   in response to the detected change in the second user profile, automatically copying, using the tag cloud processing circuitry, a media content attribute from the second tag cloud to the first tag cloud; and
   updating the first user profile to add the media content attribute to the first set of media content attributes stored in the first user profile.

2. The method of claim 1, further comprising:
   receiving a second user indication to drag-and-drop the media content attribute from the second tag cloud to the first tag cloud.

3. The method of claim 1, wherein each of the media content attributes in the first and second sets has an assigned weighting factor indicating a level of importance of the given media content attribute to a user, and wherein generating the first and second tag clouds comprises rendering each of the media content attributes in a font size indicative of its assigned weighting factor.

4. The method of claim 3 further comprising:
   assigning the copied media content attribute a weighting factor based on at least one of: the weighting factor assigned to the copied media content attribute, the weighting factors assigned to the media content attributes in the first set of media content attributes, user preference information, and manual user input.

5. The method of claim 4, wherein automatically copying the media content attribute to the first tag cloud comprises:

identifying a media content attribute in the first set of media content attributes as a candidate for removal;
removing the identified media content attribute from the first tag cloud; and
rendering, as part of the first tag cloud, the copied media content attribute in a font size indicative of its assigned weighting factor.

6. The method of claim 5, wherein identifying the media content attribute comprises determining which media content attribute in the first set of media content attributes has the smallest assigned weighting factor.

7. The method of claim 4, wherein automatically copying the media content attribute to the first tag cloud comprises:
modifying the font size of each media content attribute in the first tag cloud based on the weighting factor assigned to the copied media content attribute; and
rendering, as part of the first tag cloud, the copied media content attribute in a font size indicative of its assigned weighting factor.

8. The method of claim 1 further comprising rendering the first tag cloud in a first font characteristic and the second tag cloud in a second font characteristic different from the first font characteristic, wherein the font characteristic is one of: font face, color, shading, and style.

9. The method of claim 1 further comprising:
searching a plurality of media listings to identify first media content that matches one or more of the media content attributes within the first tag cloud; and
generating for display, in a display screen simultaneously with the first tag cloud, a first media listing from the plurality of media listings that corresponds to the identified first media content.

10. The method of claim 9 further comprising:
searching the plurality of media listings to identify second media content that matches one or more of the media content attributes within the second tag cloud; and
generating for display a second media listing from the plurality of media listings that corresponds to the identified second media content, wherein displaying the second media listing comprises displaying the second media listing in the display screen simultaneously with the first media listing, the first tag cloud, and the second tag cloud.

11. The method of claim 1, further comprising:
detecting whether the change corresponds to an addition of a media content attribute to the second set of media content attributes or a removal of a media content attribute from the second set of media content attributes, wherein the automatically copying the media content attribute from the second tag cloud to the first tag cloud occurs in response to detecting that the change corresponds to the addition of a media content attribute.

12. A system for interacting with multiple user profiles, the system comprising:
a database configured to store a first user profile that includes a first set of media content attributes and a second user profile that includes a second set of media content attributes; and
a processor configured to:
retrieve the first user profile and the second user profile from the database;
generate a first tag cloud comprising the first set of media content attributes and a second tag cloud comprising the second set of media content attributes, wherein the first tag cloud is associated with a first user and the second tag cloud is associated with a second user;
receive a user indication from a first user to subscribe to the second user profile associated with the second tag cloud, wherein the first tag cloud is associated with the first user and the second tag cloud is associated with a second user;
in response to receiving the user indication to subscribe to the second user profile, detecting a change in the second user profile;
in response to detecting the change in the second user profile, automatically copy a media content attribute to the first tag cloud from the second tag cloud; and
update the first user profile to add the media content attribute to the first set of media content attributes.

13. The system of claim 12, wherein the processor is configured to receive a second user indication to drag-and-drop the media content attribute from the second tag cloud to the first tag cloud.

14. The system of claim 12, wherein each of the media content attributes in the first and second sets has an assigned weighting factor indicating a level of importance of the given media content attribute to a user, and wherein the processor is configured to generate the first and second tag clouds by rendering each of the media content attributes in a font size indicative of its assigned weighting factor.

15. The system of claim 14, wherein the processor is further configured to assign the copied media content attribute a weighting factor based on at least one of: the weighting factor assigned to the copied media content attribute, the weighting factors assigned to the media content attributes in the first set of media content attributes, user preference information, and manual user input.

16. The system of claim 15, wherein the processor is configured to automatically copy the media content attribute to the first tag cloud by:
identifying a media content attribute in the first set of media content attributes as a candidate for removal;
removing the identified media content attribute from the first tag cloud; and
rendering, as part of the first tag cloud, the copied media content attribute in a font size indicative of its assigned weighting factor.

17. The system of claim 16, wherein the processor is configured to identify the media content attribute by determining which media content attribute in the first set of media content attributes has the smallest assigned weighting factor.

18. The system of claim 15, wherein the processor is configured to automatically copy the media content attribute to the first tag cloud by:
modifying the font size of each media content attribute in the first tag cloud based on the weighting factor assigned to the copied media content attribute; and
rendering, as part of the first tag cloud, the copied media content attribute in a font size indicative of its assigned weighting factor.

19. The system of claim 12, wherein the processor is further configured to render the first tag cloud in a first font characteristic and the second tag cloud in a second font characteristic different from the first font characteristic, wherein the font characteristic is one of: font face, color, shading, and style.

20. The system of claim 12, wherein the processor is further configured to:
search a plurality of media listings to identify first media content that matches one or more of the media content attributes within the first tag cloud; and generate for display, in a display screen simultaneously with the first tag cloud, a first media listing from the plurality of media listings that corresponds to the identified first media content.

21. The system of claim 20, wherein the processor is further configured to:
search the plurality of media listings to identify second media content that matches one or more of the media content attributes within the second tag cloud; and
generating for display a second media listing from the plurality of media listings that corresponds to the identified second media content, wherein displaying the second media listing comprises displaying the second media listing in the display screen simultaneously with the first media listing, the first tag cloud, and the second tag cloud.

22. The system of claim 12, wherein the processor is further configured to:
detect whether the change corresponds to an addition of a media content attribute to the second set of media content attributes or a removal of a media content attribute from the second set of media content attributes, wherein the automatically copying the media content attribute from the second tag cloud to the first tag cloud occurs in response to detecting that the change corresponds to the addition of a media content attribute.

* * * * *